(12) United States Patent
Ukai et al.

(10) Patent No.: US 11,549,187 B2
(45) Date of Patent: Jan. 10, 2023

(54) ELECTROCHEMICAL HYDROGEN PUMP

(71) Applicant: Panasonic Intellectual Property Management Co., Ltd., Osaka (JP)

(72) Inventors: Kunihiro Ukai, Nara (JP); Tsuneyuki Ejima, Osaka (JP); Norihiko Kawabata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 16/591,570

(22) Filed: Oct. 2, 2019

(65) Prior Publication Data

US 2020/0124039 A1 Apr. 23, 2020

(30) Foreign Application Priority Data

Oct. 18, 2018 (JP) .............................. JP2018-196391

(51) Int. Cl.
*C25B 9/05* (2021.01)
*F04B 45/047* (2006.01)
(Continued)

(52) U.S. Cl.
CPC .............. *C25B 9/05* (2021.01); *B01D 53/326* (2013.01); *C25B 1/04* (2013.01); *F04B 45/047* (2013.01);
(Continued)

(58) Field of Classification Search
CPC .... C25B 9/05; C25B 9/23; C25B 9/73; C25B 9/00; C25B 9/70; C25B 11/032;
(Continued)

(56) References Cited

U.S. PATENT DOCUMENTS 10,301,179 B2 * 5/2019 Sakai .................... H01M 8/141
10,989,184 B2 * 4/2021 Ukai .................... F04B 43/046
(Continued)

FOREIGN PATENT DOCUMENTS

JP 2006-070322 3/2006
JP 2006070322 A * 3/2006
(Continued)

OTHER PUBLICATIONS

The Extended European Search Report dated Dec. 9, 2019 for the related European Patent Application No. 19202715 9.

*Primary Examiner* — Salil Jain
(74) *Attorney, Agent, or Firm* — McDermott Will & Emery LLP

(57) ABSTRACT

An electrochemical hydrogen pump includes: at least one hydrogen pump unit including an electrolyte membrane, an anode, a cathode, an anode separator, and a cathode separator; an anode end plate disposed on the anode separator positioned in a first end in a stacking direction, the first end is one end and the second end is another end; a cathode end plate disposed on the cathode separator positioned in a second end in the stacking direction; a fixing member that prevents at least members from the cathode end plate to the cathode separator positioned in the second end from moving in the stacking direction; a first gas flow channel through which hydrogen generated in the cathode is supplied to a first space disposed between the cathode end plate and the cathode separator positioned in the second end; and a first pressure transmitting member disposed in the first space.

19 Claims, 12 Drawing Sheets

(51) Int. Cl.
C25B 1/04 (2021.01)
B01D 53/32 (2006.01)
H01M 8/026 (2016.01)
H01M 8/248 (2016.01)
H01M 8/0662 (2016.01)

(52) U.S. Cl.
CPC .......... H01M 8/026 (2013.01); H01M 8/248 (2013.01); *H01M 8/0681* (2013.01)

(58) Field of Classification Search
CPC ... C25B 9/60; C25B 9/75; C25B 9/77; H01M 8/248; B01D 53/326; B01D 2256/16; B01D 2257/108; Y02E 60/32; Y02E 60/50
See application file for complete search history.

(56) References Cited

U.S. PATENT DOCUMENTS

2004/0211679 A1* 10/2004 Wong ................ C01B 3/501
 205/765
2015/0114831 A1* 4/2015 Kawasaki ................ C25B 9/23
 204/252

FOREIGN PATENT DOCUMENTS

| JP | 2015-530726 | 10/2015 | |
|----|----|----|----|
| JP | 2018109221 A * | 7/2018 | ........... F04B 45/047 |
| WO | 2003/075379 A2 | 9/2003 | |
| WO | 2014/055416 | 4/2014 | |

\* cited by examiner

ELECTROCHEMICAL HYDROGEN PUMP

BACKGROUND

1. Technical Field

The present disclosure relates to electrochemical hydrogen pumps.

2. Description of the Related Art

Hydrogen has recently attracted attention as a clean energy source alternative to fossil fuels from environmental problems such as global warming, and energy problems, such as depletion of petroleum resources. Hydrogen is expected as clean energy since hydrogen combustion basically releases only water and releases no carbon dioxide, which causes global warming, and few nitrogen oxides and the like. Examples of devices using hydrogen as a fuel at high efficiency include fuel cells. Fuel cells are being developed and spread for automotive power supplies and for self-power generation at home.

Coming hydrogen society needs, in addition to manufacture of hydrogen, development of techniques for storing hydrogen at high density and transporting or using a small volume of hydrogen with low costs. In particular, the spreading and promotion of fuel cells serving as distributed energy sources need construction of hydrogen supply infrastructure.

To stably supply hydrogen, various proposals for manufacturing high-purity hydrogen, refining hydrogen, and storing hydrogen at high density have been made.

For example, Japanese Unexamined Patent Application Publication No. 2006-70322 (Patent Literature 1) proposes a high-pressure hydrogen manufacturing apparatus in which a stack including a solid polymer electrolyte membrane, a power supply member, and a separator is fastened with fastening bolts passing through end plates while the stack is sandwiched between the end plates. In the high-pressure hydrogen manufacturing apparatus, the solid polymer electrolyte membrane and an anode power supply member on the low pressure side deform when a difference in pressure between a cathode power supply member on the high pressure side and the anode power supply member on the low pressure side is a predetermined pressure or more. In this case, the contact resistance between the cathode power supply member on the high pressure side and the solid polymer electrolyte membrane increases.

To solve this issue, the high-pressure hydrogen manufacturing apparatus disclosed in Patent Literature 1 has a pressing unit, such as a disc spring or a coil spring, that presses the cathode power supply member on the high pressure side against the solid polymer electrolyte membrane so that the cathode power supply member comes into close contact with the solid polymer electrolyte membrane even if the solid polymer electrolyte membrane and the anode power supply member on the low pressure side deform. This configuration can suppress an increase in contact resistance between the cathode power supply member on the high pressure side and the solid polymer electrolyte membrane.

SUMMARY

However, in examples known in the related art, the increase of contact resistance between a cathode separator and a cathode has not been discussed well. One non-limiting and exemplary embodiment provides an electrochemical hydrogen pump in which an increase in contact resistance between a cathode separator and a cathode in a hydrogen pump unit can be appropriately suppressed, compared with the related art.

In one general aspect, the techniques disclosed here feature an electrochemical hydrogen pump including: at least one hydrogen pump unit that includes an electrolyte membrane, an anode disposed on a first main surface of the electrolyte membrane, a cathode disposed on a second main surface of the electrolyte membrane, an anode separator stacked on the anode, and a cathode separator stacked on the cathode; an anode end plate that is disposed on the anode separator positioned in a first end in a stacking direction, the first end is one end in the stacking direction and the second end is another end in the stacking direction; a cathode end plate that is disposed on the cathode separator positioned in a second end in the stacking direction; a fixing member that prevents at least members from the cathode end plate to the cathode separator positioned in the second end from moving in the stacking direction; a first gas flow channel through which hydrogen generated in the cathode is supplied to a first space disposed between the cathode end plate and the cathode separator positioned in the second end; and a first pressure transmitting member that is disposed in the first space and transmits a pressure from the cathode separator positioned in the second end to the cathode end plate.

The electrochemical hydrogen pump in one aspect of the present disclosure has an effect of appropriately suppressing an increase in contact resistance between the cathode separator and the cathode in the hydrogen pump unit, compared with the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

In the high-pressure hydrogen manufacturing apparatus disclosed in Patent Literature 1, the stack is fastened with fastening bolts passing through the end plates and compressed in the stacking direction. However, the diligent studies carried out by the inventors of the present invention have found that, since the gas pressure of the cathode is high, the cathode separator deforms so as to curve toward the end plate adjacent to the cathode separator, and the end plate accordingly deforms so as to curve toward the outside which is a direction away from the stack. When there is a plurality of the stacks, the separators positioned in the ends in the stacking direction in the stacks deform toward the end plates adjacent to the separators. With this deformation, the end plates also deform similarly.

As the cathode separator deforms, a larger gap than the gap described in the paragraph [0020] in Patent Literature 1 is formed between the cathode separator and the cathode power supply member. To compensate for this gap, the length of the disc spring that electrically couples the cathode power supply member to the cathode separator increases, and the disc spring thus has large electrical resistance.

Figure 1A:
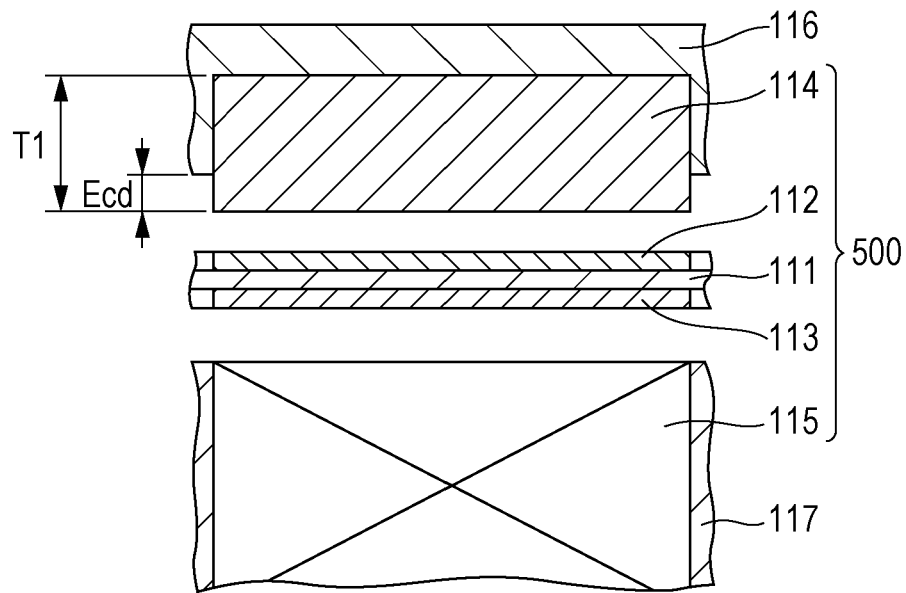
FIG. 1A is a view illustrating an example electrochemical hydrogen pump.
Figure 1B:
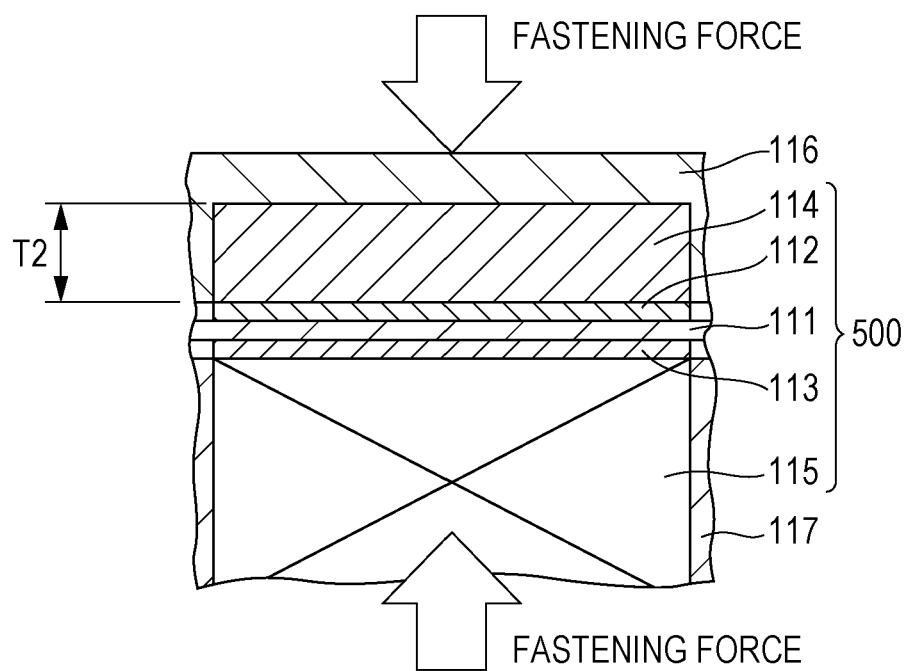
FIG. 1B is a view illustrating an example electrochemical hydrogen pump.

This feature is not limited to the high-pressure hydrogen manufacturing apparatus in Patent Literature 1 and applies to the electrochemical hydrogen pump of the prior patent provided by the applicants as illustrated in FIG. 1A and FIG. 1B.

For example, as illustrated in FIG. 1A, it is proposed that a cathode gas diffusion layer 114 is stored in a recess of a cathode separator 116 and protrudes from the recess by a predetermined amount Ecd in the thickness direction of the recess before a stack 500 is fastened. The stack 500 includes an electrolyte membrane 111, a cathode catalyst layer 112, an anode catalyst layer 113, the cathode gas diffusion layer 114, and an anode gas diffusion layer 115.

At this time, as illustrated in FIG. 1B, the cathode gas diffusion layer 114 elastically deforms in the thickness direction by the amount of protrusion Ecd in fastening the stack 500.

During the operation of the electrochemical hydrogen pump, a high pressure is applied to the anode gas diffusion layer 115, the anode catalyst layer 113, and the electrolyte membrane 111 when the gas pressure of the cathode gas diffusion layer 114 of the stack 500 increases. Thus, the anode gas diffusion layer 115, the anode catalyst layer 113, and the electrolyte membrane 111 each undergo compression deformation. However, at this time, the contact between the cathode catalyst layer 112 and the cathode gas diffusion layer 114 can be appropriately maintained by the elastic deformation of the cathode gas diffusion layer 114 in the direction in which the thickness T2 after compression with the fastener returns to the thickness T1 before compression.

However, as described above, when the gas pressure of the cathode increases, the cathode separator 116 deforms so as to curve toward the end plate (outside) (not shown) adjacent to the cathode separator 116. In this case, a gap tends to be generated between the cathode gas diffusion layer 114 and the bottom surface of the recess of the cathode separator 116, and the contact resistance between the cathode gas diffusion layer 114 and the bottom surface of the recess of the cathode separator 116 may thus increase. As a result, the voltage applied by the voltage applicator increases, which imposes a possibility that the operation efficiency of the electrochemical hydrogen pump may decrease.

It is proposed that the increase of contact resistance between the cathode separator and the cathode when the gas pressure of the cathode increases in the electrochemical hydrogen pump of the prior patent provided by the applicants is suppressed by providing a space communicating with the cathode between the cathode separator and the cathode end plate disposed on the cathode separator.

In the case where a space communicating with the cathode is provided between the cathode separator and the cathode end plate disposed on the cathode separator, the increase of contact resistance between the cathode separator and the cathode is further studied, and the following findings are obtained.

For example, as illustrated in FIG. 1B, when the cathode gas diffusion layer 114 elastically deforms in the thickness direction by the amount of protrusion Ecd in fastening the stack 500, the compression stress of the cathode gas diffusion layer 114 acts on the bottom surface of the recess of the cathode separator 116. At this time, the cathode separator 116 fails to supply a high-pressure gas to the above-mentioned space (not shown) adjacent to the cathode separator 116, and the cathode separator 116 thus deforms so as to curve toward this space (outside). In this case, a gap tends to be generated between the cathode gas diffusion layer 114 and the bottom surface of the recess of the cathode separator 116, and the contact resistance between the cathode gas diffusion layer 114 and the bottom surface of the recess of the cathode separator 116 may thus increase. As a result, the voltage applied by the voltage applicator increases, which imposes a possibility that the operation efficiency of the electrochemical hydrogen pump may decrease.

The inventors of the present invention have found that the increase of contact resistance between the cathode separator and the cathode due to the compression stress of the cathode acting on the cathode separator can be suppressed by disposing, in the above-mentioned space, a pressure transmitting member that transmits the pressure from the cathode separator to the cathode end plate, compared with the case with no pressure transmitting member.

Specifically, the electrochemical hydrogen pump in one aspect of the present disclosure includes: at least one hydrogen pump unit that includes an electrolyte membrane, an anode disposed on a first main surface of the electrolyte membrane, a cathode disposed on a second main surface of the electrolyte membrane, an anode separator stacked on the anode, and a cathode separator stacked on the cathode; an anode end plate that is disposed on the anode separator positioned in a first end in a stacking direction, the first end is one end in the stacking direction and the second end is another end in the stacking direction; a cathode end plate that is disposed on the cathode separator positioned in a second end in the stacking direction; a fixing member that prevents at least members from the cathode end plate to the cathode separator positioned in the second end from moving in the stacking direction; a first gas flow channel through which hydrogen generated in the cathode is supplied to a first space disposed between the cathode end plate and the cathode separator positioned in the second end; and a first pressure transmitting member that is disposed in the first space and transmits a pressure from the cathode separator positioned in the second end to the cathode end plate.

In the electrochemical hydrogen pump in this aspect having this configuration, the increase of contact resistance between the cathode separator and the cathode in the hydrogen pump unit can be suppressed appropriately compared with the case with no pressure transmitting member.

First, in the electrochemical hydrogen pump in this aspect, the increase of contact resistance between the cathode separator and the cathode when the gas pressure of the cathode increases is suppressed in the following manner.

In the electrochemical hydrogen pump in this aspect, high-pressure hydrogen generated in the cathode of the hydrogen pump unit can be supplied to a first space disposed between the cathode end plate and the cathode separator through the first gas flow channel. Therefore, the hydrogen gas pressure in the first space is substantially the same as the hydrogen gas pressure in the cathode of the hydrogen pump unit. The load applied to the cathode separator by hydrogen in the first space acts so as to prevent or reduce the deformation (bending) of the cathode separator toward the cathode end plate due to the hydrogen gas pressure in the cathode.

If the cathode separator bends toward the cathode end plate, a gap tends to be generated between the cathode separator and the cathode. When a gap is generated between the cathode separator and the cathode, the contact resistance between the cathode separator and the cathode increases.

However, in the electrochemical hydrogen pump in this aspect, the supply of a high-pressure hydrogen gas to the first space disposed between the cathode end plate and the cathode separator, as described above, makes it difficult for the cathode separator to bend toward the cathode end plate. Since a gap is unlikely to form between the cathode separator and the cathode of the hydrogen pump unit in the electrochemical hydrogen pump in this aspect compared with the case without the first space, the increase of contact resistance between the cathode separator and the cathode can be suppressed appropriately.

Second, in the electrochemical hydrogen pump in this aspect, the increase of contact resistance between the cathode separator and the cathode due to the compression stress of the cathode acting on the cathode separator can be suppressed in the following manner.

In the elastic deformation in the direction in which the thickness of the cathode decreases in the electrochemical hydrogen pump in this aspect, the compression stress of the cathode acts in the direction in which the cathode separator is pressed toward the first space. If the first pressure transmitting member that transmits a pressure from the cathode separator to the cathode end plate is not disposed in the first space, the cathode separator tends to bend toward the cathode end plate.

If the cathode separator bends toward the cathode end plate, a gap tends to be generated between the cathode separator and the cathode. When a gap is generated between the cathode separator and the cathode, the contact resistance between the cathode separator and the cathode increases.

However, in the electrochemical hydrogen pump in this aspect, the disposition of, in the first space, the first pressure transmitting member that transmits a pressure from the cathode separator to the cathode end plate, as described above, makes it difficult for the cathode separator to bend toward the cathode end plate in the elastic deformation in the direction in which the thickness of the cathode decreases. Since a gap is unlikely to form between the cathode separator and the cathode of the hydrogen pump unit in the electrochemical hydrogen pump in this aspect compared with the case without the first pressure transmitting member in the first space, the increase of contact resistance between the cathode separator and the cathode can be suppressed appropriately.

According to an electrochemical hydrogen pump in a second aspect of the present disclosure, there is provided the electrochemical hydrogen pump in the first aspect that may further include a cathode plate member disposed between the cathode end plate and the cathode separator positioned in the second end, wherein the first pressure transmitting member may be disposed between the cathode end plate and the cathode plate member and may include a columnar member separated from or integrated with the cathode end plate.

According to this configuration, the first space between the cathode end plate and the cathode plate member in the electrochemical hydrogen pump in this aspect enables the pressure from the cathode plate member to be appropriately transmitted to the cathode end plate through the columnar member separated from or integrated with the cathode end plate.

According to an electrochemical hydrogen pump in a third aspect of the present disclosure, there is provided the electrochemical hydrogen pump in the second aspect in which the fixing member may include a bolt, and the bolt may pass through the cathode plate member and the cathode separator positioned in the second end.

In the electrochemical hydrogen pump in this aspect, this configuration reduces the displacement of the first space in the plane direction caused as a result of the deformation of the cathode separator positioned in the second end in the stacking direction.

According to an electrochemical hydrogen pump in a fourth aspect of the present disclosure, there is provided the electrochemical hydrogen pump in the second aspect in which the cathode plate member may include a cathode insulating plate, and the columnar member may be disposed between the cathode end plate and the cathode insulating plate.

In the electrochemical hydrogen pump in this aspect, this configuration enables the pressure from the cathode insulating plate to be appropriately transmitted to the cathode end plate through the columnar member disposed between the cathode end plate and the cathode insulating plate.

According to an electrochemical hydrogen pump in a fifth aspect of the present disclosure, there is provided the electrochemical hydrogen pump in the second aspect in which the cathode plate member may include a cathode power supply plate, and the columnar member may be disposed between the cathode end plate and the cathode power supply plate. According to an electrochemical hydrogen pump in a sixth aspect of the present disclosure, there is provided the electrochemical hydrogen pump in the fifth aspect in which the columnar member may be an insulating member.

In the electrochemical hydrogen pump in this aspect, this configuration enables the pressure from the cathode power supply plate to be appropriately transmitted to the cathode end plate through the insulating columnar member disposed between the cathode end plate and the cathode power supply plate.

According to an electrochemical hydrogen pump in a seventh aspect of the present disclosure, there is provided the electrochemical hydrogen pump in the first aspect in which the first pressure transmitting member may include a porous member.

In the electrochemical hydrogen pump in this aspect, this configuration enables the pressure from the cathode separator to be appropriately transmitted to the cathode end plate through the porous member disposed in the first space.

In the electrochemical hydrogen pump in this aspect, the use of the porous member as the first pressure transmitting member can appropriately ensure gas permeability in the first space, for example, even when the porous member is disposed in substantially the entire region in the first space.

According to an electrochemical hydrogen pump in an eighth aspect of the present disclosure, there is provided the electrochemical hydrogen pump in the first aspect in which the first pressure transmitting member may include an elastic member.

In the electrochemical hydrogen pump in this aspect, this configuration enables the pressure from the cathode separator to be appropriately transmitted to the cathode end plate through the elastic member disposed in the first space.

In the electrochemical hydrogen pump in this aspect including the elastic member as the first pressure transmitting member, the elastic member may conform to the deformation of the cathode separator if the cathode separator undergoes deformation due to the compression stress of the cathode. As a result, the pressure from the cathode separator is uniformly transmitted to the cathode end plate through the elastic member.

According to an electrochemical hydrogen pump in a ninth aspect of the present disclosure, there is provided the electrochemical hydrogen pump in the first aspect in which the fixing member may further prevent members from the anode end plate to the anode separator positioned in the first end from moving in the stacking direction, and the electrochemical hydrogen pump in the first aspect may further include: a second gas flow channel through which hydrogen generated in the cathode is supplied to a second space disposed between the anode end plate and the anode separator positioned in the first end; and a second pressure transmitting member that is disposed in the second space and transmits a pressure from the anode separator positioned in the first end to the anode end plate.

In the electrochemical hydrogen pump in this aspect having this configuration, the increase of contact resistance between the cathode and the electrolyte membrane in the hydrogen pump unit when the gas pressure of the cathode increases is suppressed in the following manner.

On the basis of the hydrogen gas pressure in the cathode of the hydrogen pump unit, a load is transmitted to the anode and the anode separator. When the hydrogen gas pressure in the cathode of the hydrogen pump unit is high, the anode separator may be deformed by being pressed outward under this load. If the elastic deformation in the direction in which the thickness of the cathode increases cannot conform to the deformation of the anode separator, a gap may be generated between the cathode and the electrolyte membrane of the hydrogen pump unit. As a result, the contact resistance between the cathode and the electrolyte membrane of the hydrogen pump unit may increase.

However, in the electrochemical hydrogen pump in this aspect, high-pressure hydrogen generated in the cathode of the hydrogen pump unit can be supplied to the second space disposed between the anode end plate and the anode separator through the second gas flow channel. Therefore, the hydrogen gas pressure in the second space is substantially as high as the hydrogen gas pressure in the cathode of the hydrogen pump unit. The load applied to the anode separator by hydrogen in the second space acts so as to prevent or reduce the deformation of the anode separator due to the hydrogen gas pressure in the cathode. Since a gap is unlikely to form between the cathode and the electrolyte membrane of the hydrogen pump unit in the electrochemical hydrogen pump in this aspect compared with the case without the second space, the increase of contact resistance between the cathode and the electrolyte membrane can be suppressed appropriately.

In the electrochemical hydrogen pump in this aspect, the increase of contact resistance between the cathode and the electrolyte membrane of the hydrogen pump unit due to the compression stress of the cathode acting on the anode separator can be suppressed in the following manner.

In the elastic deformation in the direction in which the thickness of the cathode decreases, the compression stress of the cathode acts in the direction in which the anode separator is pressed toward the second space through the electrolyte membrane. If the second pressure transmitting member that transmits a pressure from the anode separator to the anode end plate is not disposed in the second space, the anode separator tends to bend toward the anode end plate. If the elastic deformation in the direction in which the thickness of the cathode increases cannot conform to the deformation of the anode separator, a gap may be generated between the cathode and the electrolyte membrane of the hydrogen pump unit. As a result, the contact resistance between the cathode and the electrolyte membrane of the hydrogen pump unit may increase.

However, in the electrochemical hydrogen pump in this aspect, the disposition of, in the second space, the second pressure transmitting member that transmits a pressure from the anode separator to the anode end plate, as described above, makes it difficult for the anode separator to bend toward the anode end plate in the elastic deformation in the direction in which the thickness of the cathode decreases.

Since a gap is unlikely to form between the cathode and the electrolyte membrane of the hydrogen pump unit in the electrochemical hydrogen pump in this aspect compared with the case without the second pressure transmitting member in the second space, the increase of contact resistance between the cathode and the electrolyte membrane can be suppressed appropriately.

According to an electrochemical hydrogen pump in a tenth aspect of the present disclosure, there is provided the electrochemical hydrogen pump in the ninth aspect that may further include an anode plate member disposed between the anode end plate and the anode separator positioned in the first end, wherein the second pressure transmitting member may be disposed between the anode end plate and the anode plate member and may include a columnar member separated from or integrated with the anode end plate.

According to this configuration, the second space between the anode end plate and the anode plate member in the electrochemical hydrogen pump in this aspect enables the pressure from the anode plate member to be appropriately transmitted to the cathode end plate through the columnar member separated from or integrated with the anode end plate.

According to an electrochemical hydrogen pump in an eleventh aspect of the present disclosure, there is provided the electrochemical hydrogen pump in the tenth aspect in which a bolt included in the fixing member may pass through the anode plate member and the anode separator positioned in the first end.

In the electrochemical hydrogen pump in this aspect, this configuration reduces the displacement of the second space in the plane direction caused as a result of the deformation of the anode separator positioned in the first end in the stacking direction.

According to an electrochemical hydrogen pump in a twelfth aspect of the present disclosure, there is provided the electrochemical hydrogen pump in the tenth aspect in which the anode plate member may include an anode insulating plate, and the columnar member may be disposed between the anode end plate and the anode insulating plate.

In the electrochemical hydrogen pump in this aspect, this configuration enables the pressure from the anode insulating plate to be appropriately transmitted to the anode end plate through the columnar member disposed between the anode end plate and the anode insulating plate.

According to an electrochemical hydrogen pump in a thirteenth aspect of the present disclosure, there is provided the electrochemical hydrogen pump in the tenth aspect in which the anode plate member may include an anode power supply plate, and the columnar member may be disposed between the anode end plate and the anode power supply plate. According to an electrochemical hydrogen pump in a fourteenth aspect of the present disclosure, there is provided the electrochemical hydrogen pump in the thirteenth aspect in which the columnar member may be an insulating member.

In the electrochemical hydrogen pump in this aspect, this configuration enables the pressure from the anode power supply plate to be appropriately transmitted to the anode end plate through the insulating columnar member disposed between the anode end plate and the anode power supply plate.

According to an electrochemical hydrogen pump in a fifteenth aspect of the present disclosure, there is provided the electrochemical hydrogen pump in the ninth aspect in which the second pressure transmitting member may include a porous member.

In the electrochemical hydrogen pump in this aspect, this configuration enables the pressure from the anode separator to be appropriately transmitted to the anode end plate through the porous member disposed in the second space.

In the electrochemical hydrogen pump in this aspect, the use of the porous member as the second pressure transmitting member can appropriately ensure gas permeability in the second space, for example, even when the porous member is disposed in substantially the entire region in the second space.

According to an electrochemical hydrogen pump in a sixteenth aspect of the present disclosure, there is provided the electrochemical hydrogen pump in the ninth aspect in which the second pressure transmitting member may include an elastic member.

In the electrochemical hydrogen pump in this aspect, this configuration enables the pressure from the anode separator to be appropriately transmitted to the anode end plate through the elastic member disposed in the second space.

In the electrochemical hydrogen pump in this aspect including the elastic member as the second pressure transmitting member, the elastic member may conform to the deformation of the anode separator even if the anode separator is deformed by the compression stress of the cathode. As a result, the pressure from the anode separator is uniformly transmitted to the anode end plate through the elastic member.

According to an electrochemical hydrogen pump in a seventeenth aspect of the present disclosure, there is provided the electrochemical hydrogen pump in any one of the first to sixteenth aspects in which the anode may include an anode gas diffusion layer, the cathode may include a cathode gas diffusion layer, and the anode gas diffusion layer may have a higher elastic modulus than the cathode gas diffusion layer.

According to an electrochemical hydrogen pump in an eighteenth aspect of the present disclosure, there is provided the electrochemical hydrogen pump in the first aspect in which the first pressure transmitting member may have the same elastic modulus as the cathode gas diffusion layer included in the cathode.

In the electrochemical hydrogen pump in this aspect having this configuration, the deformation of the cathode separator due to the compression stress of the cathode gas diffusion layer is suppressed by the reaction force generated by the elastic deformation that occurs in the direction in which the thickness of the first pressure transmitting member having the same elastic modulus as the cathode gas diffusion layer decreases. In other words, the amount of elastic deformation of the cathode gas diffusion layer is substantially equal to the amount of elastic deformation of the first pressure transmitting member. The foregoing reaction force can be thus maintained appropriately when the cathode gas diffusion layer elastically deforms in the direction in which the thickness after compression returns to the thickness before compression as the hydrogen pressure increasing operation of the electrochemical hydrogen pump proceeds.

According to an electrochemical hydrogen pump in a nineteenth aspect of the present disclosure, there is provided the electrochemical hydrogen pump in the ninth aspect in which the second pressure transmitting member may have the same elastic modulus as the cathode gas diffusion layer included in the cathode.

In the electrochemical hydrogen pump in this aspect having this configuration, the deformation of the anode separator due to the compression stress of the cathode gas diffusion layer is suppressed by the reaction force generated by the elastic deformation that occurs in the direction in which the thickness of the second pressure transmitting member having the same elastic modulus as the cathode gas diffusion layer decreases. In other words, the amount of elastic deformation of the cathode gas diffusion layer is substantially equal to the amount of elastic deformation of the second pressure transmitting member. The foregoing reaction force can be thus maintained appropriately when the cathode gas diffusion layer elastically deforms in the direction in which the thickness after compression returns to the thickness before compression as the hydrogen pressure increasing operation of the electrochemical hydrogen pump proceeds.

According to an electrochemical hydrogen pump, there is provided a twentieth aspect of the present disclosure is the electrochemical hydrogen pump in the first aspect in which the fixing member may be a fastener that fastens at least one hydrogen pump unit sandwiched between the anode end plate and the cathode end plate.

Embodiments of the present disclosure will be described below with reference to the accompanying drawings. The embodiments described below illustrate examples of the aspects described above. The shapes, materials, and components, and the arrangement positions and connection configuration of the components described below are illustrative only and should not be construed as limiting the aspects unless otherwise mentioned in Claims. Among the components described below, the components that are not mentioned in independent claims indicating the broadest concepts of the aspects are described as optional components. Redundant description of the components assigned with the same reference characters in the drawings may be avoided. Each component is schematically illustrated in the drawings for easy understanding, and the shape, the dimensional ratio, and the like may not be accurately depicted.

First Embodiment

Apparatus Structure

Figure 2A:
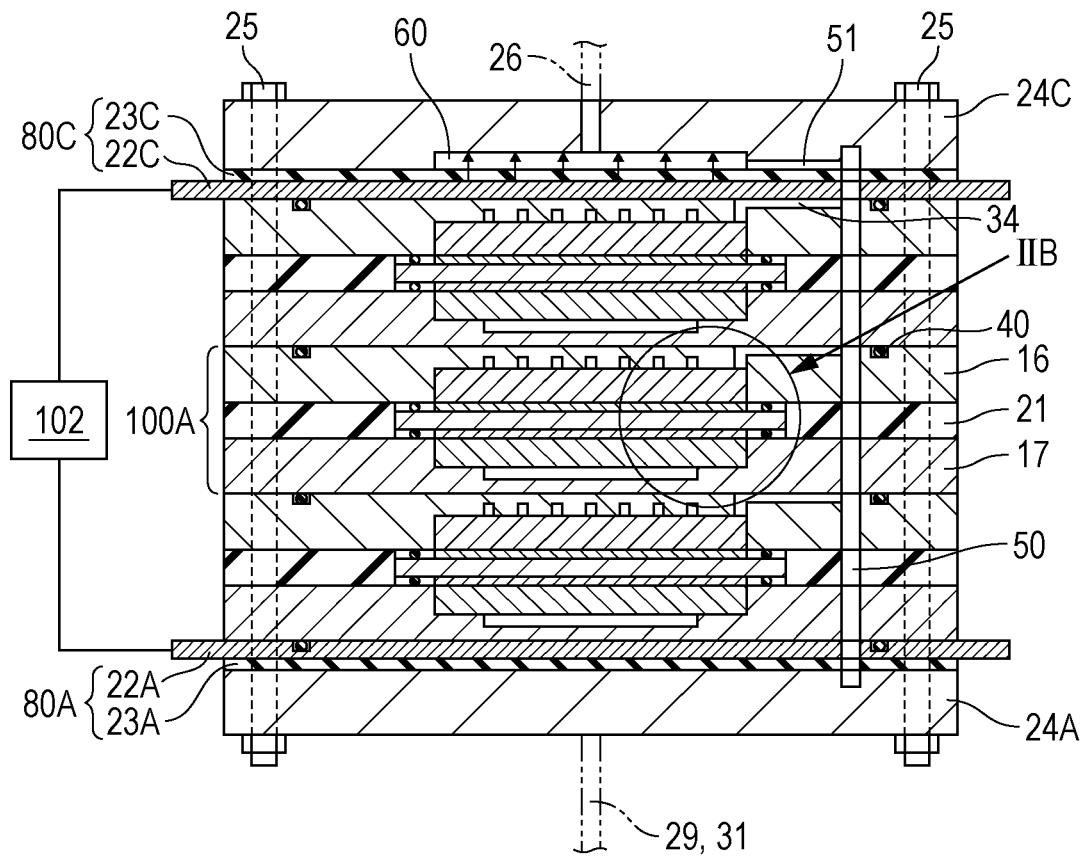
FIG. 2A is a view illustrating an example electrochemical hydrogen pump according to a first embodiment.
Figure 2B:
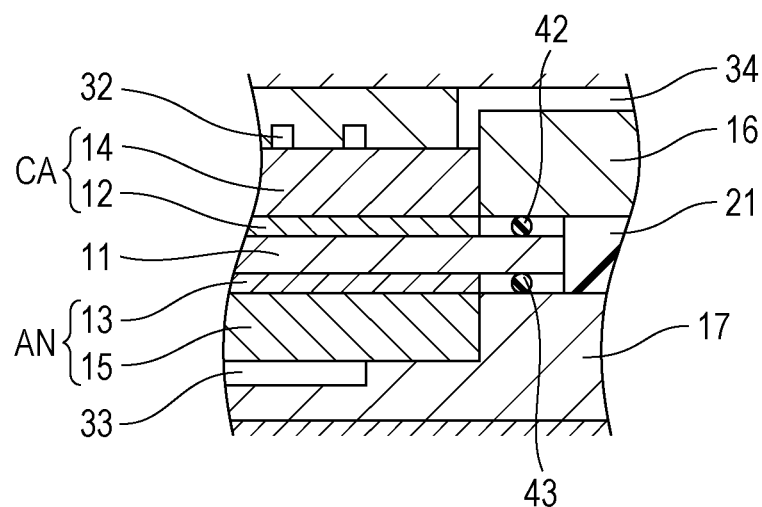
FIG. 2B is an enlarged view of a section IIB in FIG. 2A.
Figure 3A:
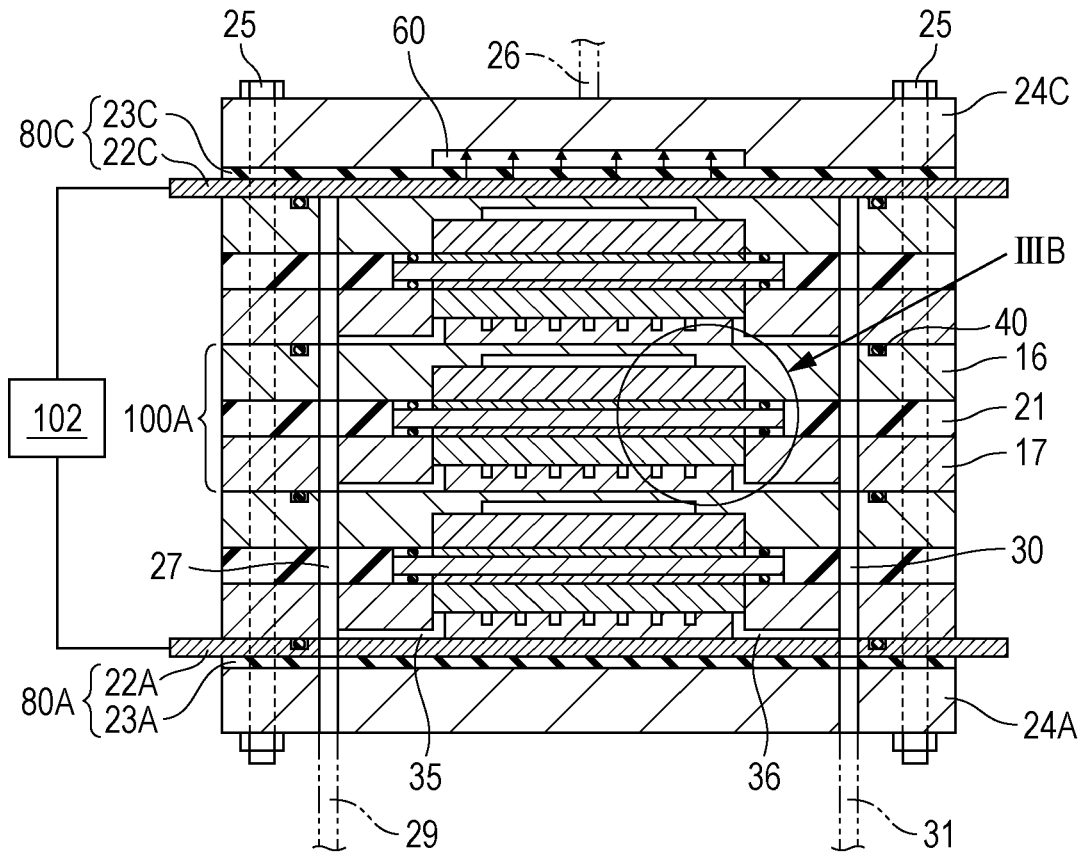
FIG. 3A is a view illustrating an example electrochemical hydrogen pump according to the first embodiment.
Figure 3B:
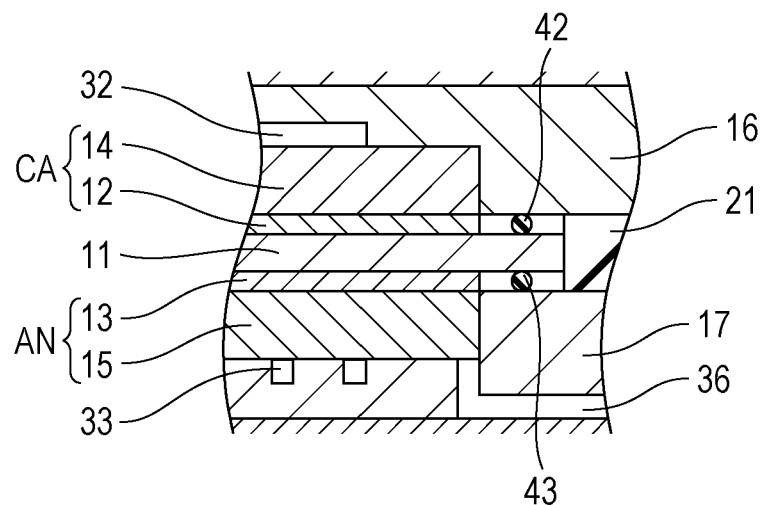
FIG. 3B is an enlarged view of a section IIIB in FIG. 3A.

FIG. 2A and FIG. 3A are views illustrating example electrochemical hydrogen pumps according to the first embodiment. FIG. 2B is an enlarged view of a section IIB in FIG. 2A. FIG. 3B is an enlarged view of a section IIIB in FIG. 3A.

FIG. 2A illustrates the vertical cross-section of an electrochemical hydrogen pump 100 including a straight line that passes through the center of the electrochemical hydrogen pump 100 and the center of a cathode gas outlet manifold 50 in plan view. FIG. 3A illustrates the vertical cross-section of the electrochemical hydrogen pump 100 including a straight line that passes through the center of the electrochemical hydrogen pump 100, the center of an anode gas inlet manifold 27, and the center of an anode gas outlet manifold 30 in plan view.

In the examples illustrated in FIG. 2A and FIG. 3A, the electrochemical hydrogen pump 100 includes at least one hydrogen pump unit 100A.

In the electrochemical hydrogen pumps 100 illustrated in FIG. 2A and FIG. 3A, three hydrogen pump units 100A are stacked on top of one another. The number of hydrogen pump units 100A is not limited to this. The number of hydrogen pump units 100A can be set to a suitable value on the basis of the operating conditions, such as the amount of hydrogen whose pressure is increased by the electrochemical hydrogen pump 100.

The hydrogen pump unit 100A includes an electrolyte membrane 11, an anode AN, a cathode CA, a cathode separator 16, an anode separator 17, and an insulator 21.

The anode AN is disposed in a first main surface of the electrolyte membrane 11. The anode AN is an electrode including an anode catalyst layer 13 and an anode gas diffusion layer 15 disposed on the anode catalyst layer 13. In plan view, an annular seal member 43 is disposed so as to surround the periphery of the anode catalyst layer 13, and the anode catalyst layer 13 is appropriately sealed by the seal member 43.

The cathode CA is disposed in a second main surface of the electrolyte membrane 11. The cathode CA is an electrode including a cathode catalyst layer 12 and a cathode gas diffusion layer 14 disposed on the cathode catalyst layer 12. In plan view, an annular seal member 42 is disposed so as to surround the periphery of the cathode catalyst layer 12, and the cathode catalyst layer 12 is appropriately sealed by the seal member 42.

Accordingly, the electrolyte membrane 11 is sandwiched between the anode AN and the cathode CA in such a manner that the electrolyte membrane 11 is in contact with the anode catalyst layer 13 and the cathode catalyst layer 12. A stack of the cathode CA, the electrolyte membrane 11, and the anode AN is referred to as a membrane electrode assembly (MEA).

The electrolyte membrane 11 has proton conductivity. The electrolyte membrane 11 may be made of any material as long as it has proton conductivity. Examples of the electrolyte membrane 11 include, but are not limited to, fluoropolymer electrolyte membranes and hydrocarbon polymer electrolyte membranes. Specifically, for example, Nafion (registered trademark, available from DuPont) and Aciplex (registered trademark, available from Asahi Kasei Corporation) can be used as the electrolyte membrane 11.

The anode catalyst layer 13 is disposed in the first main surface of the electrolyte membrane 11. The anode catalyst layer 13 contains, for example, platinum as a catalyst metal, but the catalyst metal is not limited to platinum.

The cathode catalyst layer 12 is disposed in the second main surface of the electrolyte membrane 11. The cathode catalyst layer 12 contains, for example, platinum as a catalyst metal, but the catalyst metal is not limited to platinum.

Examples of the catalyst support in the cathode catalyst layer 12 and the anode catalyst layer 13 include, but are not limited to, carbon powders formed of, for example, carbon black and graphite; and electrically conductive oxide powders.

In the cathode catalyst layer 12 and the anode catalyst layer 13, the fine particles of the catalyst metal are highly dispersed and supported on the catalyst support. The cathode catalyst layer 12 and the anode catalyst layer 13 normally contain an ionomer component having hydrogen ion conductivity in order to increase the electrode reaction area.

The anode gas diffusion layer 15 is formed of a porous material and has electrical conductivity and gas diffusibility. The anode gas diffusion layer 15 preferably has high rigidity so as to prevent or reduce displacement and deformation of constituent members caused by a difference in pressure between the cathode CA and the anode AN during operation of the electrochemical hydrogen pump 100. In other words, the anode gas diffusion layer 15 has a higher elastic modulus than the cathode gas diffusion layer 14.

Examples of the base material of the anode gas diffusion layer 15 include sintered products of metal fibers formed of titanium, titanium alloys, stainless steel, and the like; and sintered products of metal powders, expanded metals, metal meshes, and punched metals formed of these materials.

The cathode gas diffusion layer 14 is formed of a porous material and has electrical conductivity and gas diffusibility. The cathode gas diffusion layer 14 preferably has elasticity so as to appropriately conform to displacement and deformation of constituent members caused by a difference in pressure between the cathode and the anode during operation of the electrochemical hydrogen pump 100. In other words, the cathode gas diffusion layer 14 has a lower elastic modulus than the anode gas diffusion layer 15.

Examples of the base material of the cathode gas diffusion layer 14 include sintered products of metal fibers formed of titanium, titanium alloys, stainless steel, and the like; and sintered products of metal powders, expanded metals, metal meshes, and punched metals formed of these materials. Examples of the base material of the cathode gas diffusion layer 14 include porous carbon materials, such as carbon paper, carbon cloth, and carbon felt. Moreover, for example, porous sheet materials formed by kneading carbon black and an elastomer such as PTFE and rolling the kneaded material can also be used.

The anode separator 17 is a member stacked on the anode AN. The cathode separator 16 is a member stacked on the cathode CA. The cathode separator 16 and the anode separator 17 each have a recess in their central portion. The cathode gas diffusion layer 14 and the anode gas diffusion layer 15 are stored in the respective recesses.

Accordingly, the hydrogen pump unit 100A is formed by sandwiching the MEA between the cathode separator 16 and the anode separator 17.

In plan view, for example, a serpentine cathode gas flow channel 32 including a plurality of U-shaped curved portions and a plurality of linear portions is provided in the main surface of the cathode separator 16 in contact with the cathode gas diffusion layer 14. The linear portions of the cathode gas flow channel 32 extend in the direction perpendicular to the plane of FIG. 2A. However, the cathode gas flow channel 32 is illustrative, and the present invention is not limited to this example. For example, the cathode gas flow channel may include a plurality of linear flow channels.

In plan view, for example, a serpentine anode gas flow channel 33 including a plurality of U-shaped curved portions and a plurality of linear portions is provided in the main surface of the anode separator 17 in contact with the anode gas diffusion layer 15. The linear portions of the anode gas flow channel 33 extend in the direction perpendicular to the plane of FIG. 3A. However, the anode gas flow channel 33 is illustrative, and the present invention is not limited to this example. For example, the anode gas flow channel may include a plurality of linear flow channels.

An annular and plate-shaped insulator 21 is sandwiched between the cathode separator 16 and the anode separator 17 each having electrical conductivity. The insulator 21 surrounds the periphery of the MEA. This configuration avoids the short circuit between the cathode separator 16 and the anode separator 17.

As illustrated in FIG. 2A and FIG. 3A, the electrochemical hydrogen pump 100 includes an anode end plate 24A and a cathode end plate 24C.

The anode end plate 24A is a member disposed on the anode separator 17 positioned in the first end of the electrochemical hydrogen pump 100 in the stacking direction of the members of the hydrogen pump unit 100A. The anode separator 17 positioned in the first end of the electrochemical hydrogen pump 100 is, namely, the anode separator 17 positioned closest to the anode end plate 24A. In addition, the cathode end plate 24C is a member disposed on the cathode separator 16 positioned in the second end of the electrochemical hydrogen pump 100 in the stacking direction of the members of the hydrogen pump unit 100A. The cathode separator 16 positioned in the second end of the electrochemical hydrogen pump 100 is, namely, the cathode separator 16 positioned closest to the cathode end plate 24C.

As illustrated in FIG. 2A and FIG. 3A, the electrochemical hydrogen pump 100 includes a fixing member that prevents at least members from the cathode end plate 24C to the cathode separator 16 positioned in the second end of the electrochemical hydrogen pump 100 from moving in the stacking direction of the members of the hydrogen pump unit 100A.

The members of the hydrogen pump unit 100A correspond to the electrolyte membrane 11, the anode AN, the cathode CA, the anode separator 17, and the cathode separator 16. Members from the cathode end plate 24C to the cathode separator 16 positioned in the second end correspond to the cathode end plate 24C, the cathode separator 16 positioned in the second end, and the members stacked between the cathode end plate 24C and the cathode separator 16 positioned in the second end. In this embodiment, specifically, the members from the cathode end plate 24C to the cathode separator 16 positioned in the second end correspond to the cathode end plate 24C, a cathode insulating plate 23C, a cathode power supply plate 22C, and the cathode separator 16 positioned in the second end.

The fixing member may have any structure as long as it can fix, in the stacking direction of the members of the hydrogen pump unit 100A, at least the members from the cathode end plate 24C to the cathode separator 16 positioned in the second end of the electrochemical hydrogen pump 100. For example, as illustrated in FIG. 2A and FIG. 3A, the fixing member may be a fastener 25 that fastens at least one hydrogen pump unit 100A sandwiched between the anode end plate 24A and the cathode end plate 24C. Examples of the fastener 25 include a bolt and a disc spring nut.

In this case, the bolts of the fastener 25 may pass through only the anode end plate 24A and the cathode end plate 24C.

In the electrochemical hydrogen pump 100 according to this embodiment, however, the bolts of the fastener 25 pass through, in addition to the anode end plate 24A and the cathode end plate 24C, the members of the hydrogen pump unit 100A, a cathode plate member 80C disposed between the cathode end plate 24C and the cathode separator 16 positioned in the second end, and an anode plate member 80A disposed between the anode end plate 24A and the anode separator 17 positioned in the first end.

The fastener 25 applies a desired fastening pressure to the hydrogen pump unit 100A in such a manner that the end surface of the cathode separator 16 positioned in the second end of the electrochemical hydrogen pump 100 in the stacking direction and the end surface of the anode separator 17 positioned in the first end of the electrochemical hydrogen pump 100 in the stacking direction are sandwiched between the cathode end plate 24C and the anode end plate 24A, with the cathode plate member 80C interposed between the cathode separator 16 and the cathode end plate 24C and the anode plate member 80A interposed between the anode separator 17 and the anode end plate 24A.

In other words, in this embodiment, the fixing member further prevents, in addition to the members from the cathode end plate 24C to the cathode separator 16 positioned in the second end of the electrochemical hydrogen pump 100, and members from the anode end plate 24A to the anode separator 17 positioned in the first end of the electrochemical hydrogen pump 100 from moving in the stacking direction of the members of the hydrogen pump unit 100A. The members from the anode end plate 24A to the anode separator 17 positioned in the first end of the electrochemical hydrogen pump 100 correspond to the anode end plate 24A, the anode separator 17 positioned in the first end, the members stacked between the anode end plate 24A and the anode separator 17 positioned in the first end. In this embodiment, specifically, and the members from the anode end plate 24A to the anode separator 17 positioned in the first end correspond to the anode end plate 24A, an anode insulating plate 23A, an anode power supply plate 22A, and the anode separator 17 positioned in the first end.

The cathode plate member 80C is, for example, a member including the cathode power supply plate 22C and the cathode insulating plate 23C. The anode plate member 80A is, for example, a member including the anode power supply plate 22A and the anode insulating plate 23A.

Accordingly, three hydrogen pump units 100A are appropriately maintained in the stacked state by means of the fastening pressure of the fastener 25 while the bolts of the fastener 25 pass through the cathode plate member 80C, the cathode separator 16 closest to the cathode plate member 80C, the anode plate member 80A, and the anode separator 17 closest to the anode plate member 80A. Since the bolts included in the fastener 25 pass through the cathode plate member 80C and the anode plate member 80A, the cathode plate member 80C and the anode plate member 80A can be appropriately prevented from moving in the in-plane direction. This configuration reduces the displacement of a first space 60 in the plane direction (described below) caused as a result of the deformation of the cathode separator 16 positioned in the second end in the stacking direction. This configuration also reduces the displacement of a second space 65 in the plane direction (described below) caused as a result of the deformation of the anode separator 17 positioned in the first end of the electrochemical hydrogen pump 100 in the stacking direction.

Although detailed description and illustration are omitted here, instead of using the fastener 25, the electrochemical hydrogen pump may be fixed by disposing a seal material made of resin on the side surfaces of the members of the electrochemical hydrogen pump.

As illustrated in FIG. 2A and FIG. 3A, the electrochemical hydrogen pump 100 includes a first gas flow channel through which hydrogen generated in the cathode CA is supplied to the first space 60 disposed between the cathode end plate 24C and the cathode separator 16 positioned in the second end.

The first space 60 has any feature as long as the first space 60 is disposed between the cathode end plate 24C and the cathode separator 16 positioned in the second end. In the examples illustrated in FIG. 2A and FIG. 3A, the first space 60 is formed by a recess in a central portion of the cathode end plate 24C. In other words, the first space 60 is defined by the recess in the central portion of the cathode end plate 24C and the cathode insulating plate 23C. Other examples of the first space will be described in Modifications.

In the electrochemical hydrogen pump 100 according to this embodiment, the first pressure transmitting member is provided in the first space 60 as indicated by the arrows in FIG. 2A and FIG. 3A. The first pressure transmitting member may have any structure as long as it can transmit a pressure from the cathode separator 16 positioned in the second end to the cathode end plate 24C. Specific structures of the first pressure transmitting member will be described in Examples.

The first gas flow channel may have any structure as long as hydrogen generated in the cathode CA can be supplied to the first space 60 through the first gas flow channel. For example, in the electrochemical hydrogen pump 100 according to this embodiment, as illustrated in FIG. 2A, the first gas flow channel includes a tubular cathode gas outlet manifold 50 and a cathode gas supply channel 51 through which the cathode gas outlet manifold 50 is in communication with the first space 60.

The cathode gas outlet manifold 50 is formed by connection of through-holes in the members of the hydrogen pump unit 100A and non-through holes in the anode end plate 24A and the cathode end plate 24C.

The cathode gas supply channel 51 is formed by a groove that is provided in the main surface of the cathode end plate 24C and through which the inside of the recess (first space 60) of the cathode end plate 24C is in communication with a second end portion of the cathode gas outlet manifold 50.

As illustrated in FIG. 2A, a cathode gas outlet channel 26 is disposed in the cathode end plate 24C. The cathode gas outlet channel 26 may be formed by a pipe through which hydrogen (H2) discharged from the cathode CA flows. The cathode gas outlet channel 26 is in communication with the first space 60. Accordingly, the cathode gas outlet channel 26 is in communication with the cathode gas outlet manifold 50 through the first space 60 and the cathode gas supply channel 51.

The cathode gas outlet manifold 50 is in communication with a first end portion of the cathode gas flow channel 32 of each hydrogen pump unit 100A through the corresponding cathode gas passage 34. In other words, in the electrochemical hydrogen pump 100 according to this embodiment, the cathode gas flow channels 32 are in communication with each other. The cathode gas leaving the cathode gas diffusion layer 14 of each hydrogen pump unit 100A flows through the corresponding cathode gas flow channel 32. Accordingly, hydrogen flows that have passed through the cathode gas flow channels 32 and the cathode gas passages 34 of the respective hydrogen pump units 100A merge in the cathode gas outlet manifold 50. The merged hydrogen flow passes through the cathode gas supply channel 51 and the first space 60 in this order and is guided to the cathode gas outlet channel 26. High-pressure hydrogen flows through the first space 60 accordingly.

In plan view, annular seal members 40, such as O-rings, are disposed between the cathode separator 16 and the anode separator 17, between the cathode separator 16 and the cathode power supply plate 22C, and between the anode separator 17 and the anode power supply plate 22A so as to surround the cathode gas outlet manifold 50. The cathode gas outlet manifold 50 is appropriately sealed by the seal members 40.

As illustrated in FIG. 3A, an anode gas inlet channel 29 is provided in the anode end plate 24A. The anode gas inlet channel 29 may be formed by a pipe through which hydrogen (H2) supplied to the anode AN flows. The anode gas inlet channel 29 is in communication with the tubular anode gas inlet manifold 27. The anode gas inlet manifold 27 is formed by connection of through-holes in the members of the hydrogen pump unit 100A and the anode end plate 24A.

The anode gas inlet manifold 27 is in communication with the first end portion of the anode gas flow channel 33 of each hydrogen pump unit 100A through the corresponding first anode gas passage 35. The hydrogen supplied to the anode gas inlet manifold 27 from the anode gas inlet channel 29 is thus distributed to the hydrogen pump units 100A through the first anode gas passages 35 of the hydrogen pump units

100A. While the distributed hydrogen passes thorough the anode gas flow channels 33, hydrogen is supplied to the anode catalyst layers 13 from the anode gas diffusion layers 15.

As illustrated in FIG. 3A, an anode gas outlet channel 31 is provided in the anode end plate 24A. The anode gas outlet channel 31 may be formed by a pipe through which hydrogen (H2) discharged from the anode AN flows. The anode gas outlet channel 31 is in communication with the tubular anode gas outlet manifold 30. The anode gas outlet manifold 30 is formed by connection of through-holes in the members of the hydrogen pump unit 100A and the anode end plate 24A.

The anode gas outlet manifold 30 is in communication with a second end portion of the anode gas flow channel 33 of each hydrogen pump unit 100A through the corresponding second anode gas passage 36. Accordingly, hydrogen flows that have passed through the anode gas flow channels 33 of the hydrogen pump units 100A are supplied to the anode gas outlet manifold 30 through the respective second anode gas passages 36 and merge in the anode gas outlet manifold 30. The merged hydrogen flow is guided to the anode gas outlet channel 31.

In plan view, annular seal members 40, such as O-rings, are disposed between the cathode separator 16 and the anode separator 17, between the cathode separator 16 and the cathode power supply plate 22C, and between the anode separator 17 and the anode power supply plate 22A so as to surround the anode gas inlet manifold 27 and the anode gas outlet manifold 30. The anode gas inlet manifold 27 and the anode gas outlet manifold 30 are appropriately sealed by the seal members 40.

As illustrated in FIG. 2A and FIG. 3A, the electrochemical hydrogen pump 100 includes a voltage applicator 102.

The voltage applicator 102 is a device that applies a voltage across the anode AN and the cathode CA. Specifically, a high potential of the voltage applicator 102 is applied to the anode AN having electrical conductivity, and a low potential of the voltage applicator 102 is applied to the cathode CA having electrical conductivity. The voltage applicator 102 may have any structure as long as it can apply a voltage across the anode AN and the cathode CA. For example, the voltage applicator 102 may be a device that controls the voltage applied across the anode AN and the cathode CA. In this case, the voltage applicator 102 includes a DC/DC converter when connected to a direct-current power supply, such as a battery, a solar cell, and a fuel cell, and includes an AC/DC converter when connected to an alternating-current power supply, such as a commercial power supply.

The voltage applicator 102 may be, for example, an electric power-type power supply that controls the voltage applied across the anode AN and the cathode CA and the current flowing between the anode AN and the cathode CA in such a manner that the electric power supplied to the hydrogen pump unit 100A becomes a predetermined value.

In the examples illustrated in FIG. 2A and FIG. 3A, the terminal of the voltage applicator 102 on the low-potential side is connected to the cathode power supply plate 22C, and the terminal of the voltage applicator 102 on the high-potential side is connected to the anode power supply plate 22A. The cathode power supply plate 22C is in electrical contact with the cathode separator 16 positioned in the second end of the electrochemical hydrogen pump 100 in the stacking direction. The anode power supply plate 22A is in electrical contact with the anode separator 17 positioned in the first end of the electrochemical hydrogen pump 100 in the stacking direction.

Although not shown, a hydrogen supply system including the electrochemical hydrogen pump 100 can be constructed. In this case, a device required for the hydrogen supply operation of the hydrogen supply system is provided as needed.

For example, the hydrogen supply system may include a dew-point controller (e.g., humidifier) that controls the dew point of a gas mixture of high-humidity hydrogen (H2) discharged from the anode AN through the anode gas outlet channel 31 and low-humidity hydrogen (H2) supplied from an external hydrogen supply source through the anode gas inlet channel 29. In this case, hydrogen from the external hydrogen supply source may be, for example, generated in a water electrolysis device.

The hydrogen supply system may include, for example, a temperature sensor that senses the temperature of the electrochemical hydrogen pump 100; a hydrogen reservoir that temporarily stores hydrogen discharged from the cathode CA of the electrochemical hydrogen pump 100; and a pressure sensor that senses the hydrogen gas pressure in the hydrogen reservoir.

The structure of the electrochemical hydrogen pump 100 and various devices (not shown) in the hydrogen supply system are illustrative, and the present invention is not limited to this example.

For example, a dead-end structure in which the pressure of the total hydrogen supply to the anode AN through the anode gas inlet manifold 27 is increased in the cathode CA may be employed without providing the anode gas outlet manifold 30 and the anode gas outlet channel 31. For example, hydrogen (H2) flows through the anode gas flow channel 33 and the cathode gas flow channel 32 as described above, but the hydrogen concentration is not necessarily 100%. A hydrogen-containing gas may flow.

Operation

An example of the hydrogen pressure increasing operation of the electrochemical hydrogen pump 100 will be described below with reference to the drawings.

The following operation may be performed by, for example, an arithmetic circuit of a controller (not shown) reading a control program from a memory circuit of the controller. However, the following operation is not necessarily performed by the controller. An operator may operate part of the operation.

First, low-pressure hydrogen is supplied to the anode AN of the electrochemical hydrogen pump 100, and the voltage of the voltage applicator 102 is applied to the electrochemical hydrogen pump 100.

In the anode catalyst layer 13 of the anode AN, a hydrogen molecule dissociates into hydrogen ions (protons) and electrons in the oxidation reaction (formula (1)). The protons are conducted through the electrolyte membrane 11 and transferred to the cathode catalyst layer 12. The electrons are transferred to the cathode catalyst layer 12 through the voltage applicator 102.

In the cathode catalyst layer 12, a hydrogen molecule is generated again in the reduction reaction (formula (2)). It is known that a predetermined amount of water serving as electroosmosis water is transferred from the anode AN to the cathode CA together with protons when protons are conducted through the electrolyte membrane 11.

At this time, the pressure of hydrogen (H2) generated in the cathode CA can be increased by raising the pressure drop of a hydrogen outlet channel by using a flow rate controller (not shown). High-pressure hydrogen generated in the cathode CA is thus supplied to the first space 60 between the cathode end plate 24C and the cathode separator 16 through the cathode gas outlet manifold 50 and the cathode gas supply channel 51. Examples of the hydrogen outlet channel include the cathode gas outlet channel 26 in FIG. 2A. Examples of the low rate controller include a back pressure valve and a regulator valve, which are provided at the hydrogen outlet channel.

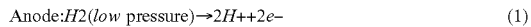

$$\text{Anode:} H2(\text{low pressure}) \rightarrow 2H^+ + 2e^- \tag{1}$$

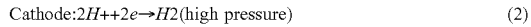

$$\text{Cathode:} 2H^+ + 2e^- \rightarrow H2(\text{high pressure}) \tag{2}$$

In the electrochemical hydrogen pump 100, the pressure of hydrogen supplied to the anode AN is thus increased in the cathode CA by application of a voltage with the voltage applicator 102. The hydrogen pressure increasing operation of the electrochemical hydrogen pump 100 is performed accordingly, and the hydrogen whose pressure has been increased in the cathode CA is, for example, temporarily stored in a hydrogen reservoir (not shown). The hydrogen stored in the hydrogen reservoir is supplied to a hydrogen receptor at suitable timing. Examples of the hydrogen receptor include fuel cells which generate electric power by using hydrogen.

In the hydrogen pressure increasing operation of the electrochemical hydrogen pump 100, the gas pressure of the cathode CA increases, which presses the electrolyte membrane 11, the anode catalyst layer 13, and the anode gas diffusion layer 15. This pressing compresses each of the electrolyte membrane 11, the anode catalyst layer 13, and the anode gas diffusion layer 15.

If the adhesion between the cathode catalyst layer 12 and the cathode gas diffusion layer 14 is low at this time, a gap tends to be generated between the cathode catalyst layer 12 and the cathode gas diffusion layer 14. When a gap is generated between the cathode catalyst layer 12 and the cathode gas diffusion layer 14, the contact resistance between the cathode catalyst layer 12 and the cathode gas diffusion layer 14 increases. As a result, the voltage applied by the voltage applicator 102 increases, which imposes a possibility that the operation efficiency of the electrochemical hydrogen pump 100 may decrease.

The cathode gas diffusion layer 14 protrudes from the recess of the cathode separator 16 by a desired amount of protrusion Ecd in the thickness direction of the recess before the hydrogen pump unit 100A is fastened with the fastener 25. The cathode gas diffusion layer 14 is compressed with the fastening force of the fastener 25 by the above-described amount of protrusion when the hydrogen pump unit 100A is fastened.

Accordingly, even if the electrolyte membrane 11, the anode catalyst layer 13, and the anode gas diffusion layer 15 each undergo compression deformation during the operation of the electrochemical hydrogen pump 100, the contact between the cathode catalyst layer 12 and the cathode gas diffusion layer 14 can be appropriately maintained by the elastic defamation of the cathode gas diffusion layer 14 in the direction in which the thickness after compression with the fastener 25 returns to the original thickness before compression in the electrochemical hydrogen pump 100 according to this embodiment.

In the electrochemical hydrogen pump 100 according to this embodiment, the increase of contact resistance between the cathode separator 16 and the cathode CA in the hydrogen pump unit 100A may be appropriately suppressed, compared with the related art.

First, in the electrochemical hydrogen pump 100 according to this embodiment, the increase of contact resistance between the cathode separator 16 and the cathode gas diffusion layer 14 when the gas pressure of the cathode CA increases is suppressed in the following manner.

In the electrochemical hydrogen pump 100 according to this embodiment, high-pressure hydrogen generated in the cathode CA of the hydrogen pump unit 100A can be supplied to the first space 60 disposed between the cathode end plate 24C and the cathode insulating plate 23C through the cathode gas outlet manifold 50 and the cathode gas supply channel 51. Therefore, the hydrogen gas pressure in the first space 60 is substantially the same as the hydrogen gas pressure in the cathode CA of the hydrogen pump unit 100A. The load applied to the cathode separator 16 by hydrogen in the first space 60 acts so as to prevent or reduce the deformation (bending) of the cathode separator 16 toward the cathode end plate 24C due to the hydrogen gas pressure in the cathode CA.

If the cathode separator 16 bends toward the cathode end plate 24C, a gap tends to be generated between the cathode separator 16 and the cathode gas diffusion layer 14. When a gap is generated between the cathode separator 16 and the cathode gas diffusion layer 14, the contact resistance between the cathode separator 16 and the cathode gas diffusion layer 14 increases.

However, in the electrochemical hydrogen pump 100 according to this embodiment, the supply of a high-pressure hydrogen gas to the first space 60 disposed between the cathode end plate 24C and the cathode insulating plate 23C, as described above, makes it difficult for the cathode separator 16 to bend toward the cathode end plate 24C. Since a gap is unlikely to form between the cathode separator 16 and the cathode gas diffusion layer 14 of the hydrogen pump unit 100A in the electrochemical hydrogen pump 100 according to this embodiment compared with the case without the first space 60, the increase of contact resistance between the cathode separator 16 and the cathode gas diffusion layer 14 can be suppressed appropriately.

Second, in the electrochemical hydrogen pump 100 according to this embodiment, the increase of contact resistance between the cathode separator 16 and the cathode gas diffusion layer 14 due to the compression stress of the cathode gas diffusion layer 14 acting on the cathode separator 16 can be suppressed in the following manner.

In the electrochemical hydrogen pump 100 according to this embodiment, the compression stress of the cathode gas diffusion layer 14 acts in the direction in which the cathode separator 16 is pressed toward the first space 60 in the elastic deformation in the direction in which the cathode gas diffusion layer 14 decreases. If the first pressure transmitting member that transmits a pressure from the cathode separator 16 to the cathode end plate 24C is not disposed in the first space 60, the cathode separator 16 tends to bend toward the cathode end plate 24C.

If the cathode separator 16 bends toward the cathode end plate 24C, a gap tends to be generated between the cathode separator 16 and the cathode gas diffusion layer 14. If a gap is generated between the cathode separator 16 and the cathode gas diffusion layer 14, the contact resistance between the cathode separator 16 and the cathode gas diffusion layer 14 increases.

However, in the electrochemical hydrogen pump 100 according to this embodiment, the disposition of, in the first space 60, the first pressure transmitting member that transmits a pressure from the cathode separator 16 to the cathode end plate 24C, as described above, makes it difficult for the cathode separator 16 to bend toward the cathode end plate 24C in the elastic deformation in the direction in which the thickness of the cathode gas diffusion layer 14 decreases. Since a gap is unlikely to form between the cathode separator 16 and the cathode gas diffusion layer 14 of the hydrogen pump unit 100A in the electrochemical hydrogen pump 100 according to this embodiment compared with the case without the first pressure transmitting member in the first space 60, the increase of contact resistance between the cathode separator 16 and the cathode gas diffusion layer 14 can be suppressed appropriately.

In the examples illustrated in FIG. 2A and FIG. 3A, the first space 60 is parallel to the main surface of the cathode CA in the electrochemical hydrogen pump 100.

The load transmitted to the cathode separator 16 can be thus uniformly distributed in the plane of the cathode separator 16 on the basis of the hydrogen gas pressure in the first space 60. Therefore, the electrochemical hydrogen pump 100 according to this embodiment effectively operates in such a manner that the load applied to the cathode separator 16 by hydrogen in the first space 60 prevents or reduces deformation (bending) of the cathode separator 16 compared with the case where the first space 60 is not parallel to the main surface of the cathode CA.

In the examples illustrated in FIG. 2A and FIG. 3A, the opening area of the first space 60 in the direction parallel to the main surface of the cathode separator 16 in the electrochemical hydrogen pump 100 is larger than or equal to the area of the main surface of the cathode CA. However, the opening area of such a first space 60 is smaller than or equal to the area of the main surface of the cathode separator 16.

If the opening area of the first space 60 in the direction parallel to the main surface of the cathode separator 16 is smaller than the area of the main surface of the cathode CA, there is a possibility that a portion of the cathode separator 16 that corresponds to the cathode CA and is not covered with the first space 60 may undergo deformation due to the hydrogen gas pressure in the cathode CA.

However, in the electrochemical hydrogen pump 100 according to this embodiment, the entire region of the main surface of the cathode CA can be covered with the first space 60 by setting the opening area of the first space 60 to the area of the main surface of the cathode CA or larger. Thus, the load is transmitted to the entire region of the cathode separator 16 facing the cathode CA on the basis of the hydrogen gas pressure in the first space 60, which can reduce the above-described possibility.

EXAMPLES

Specific structures of the first pressure transmitting member will be described below with reference to the drawings.

Example 1

Figure 4A:
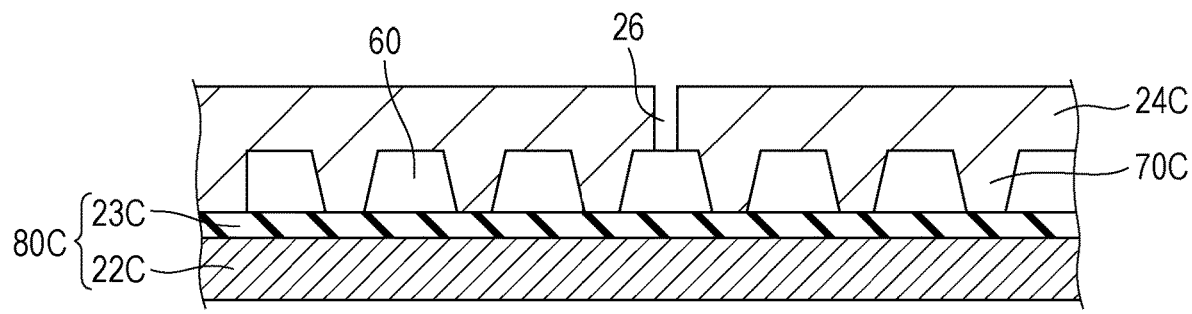
FIG. 4A is a view illustrating an example electrochemical hydrogen pump in Example 1 according to the first embodiment.

FIG. 4A is a view illustrating an example electrochemical hydrogen pump in Example 1 according to the first embodiment. In FIG. 4A, a first pressure transmitting member in a first space 60 of an electrochemical hydrogen pump 100 is depicted.

In the example illustrated in FIG. 4A, the first pressure transmitting member is disposed between a cathode end plate 24C and a cathode plate member 80C and includes columnar members 70C integrated with the cathode end plate 24C. In this example, the columnar members 70C are disposed between the cathode end plate 24C and a cathode insulating plate 23C. Specifically, the columnar members 70C integrated with the cathode end plate 24C are arranged at regular intervals in a planar manner in the first space 60, and the end portions of the columnar members 70C are in contact with the cathode insulating plate 23C. The cross-sectional shape of the columnar members 70C may be circular or rectangular.

In the electrochemical hydrogen pump 100 in Example 1, this configuration enables the pressure from the cathode insulating plate 23C to be appropriately transmitted to the cathode end plate 24C through the columnar members 70C disposed between the cathode end plate 24C and the cathode insulating plate 23C. In the electrochemical hydrogen pump 100 in Example 1, hydrogen ($H_2$) can flow through the first space 60 through voids present between adjacent columnar members 70C.

The electrochemical hydrogen pump 100 in Example 1 may be the same as the electrochemical hydrogen pump 100 according to the first embodiment except for the foregoing features.

Example 2

Figure 4B:
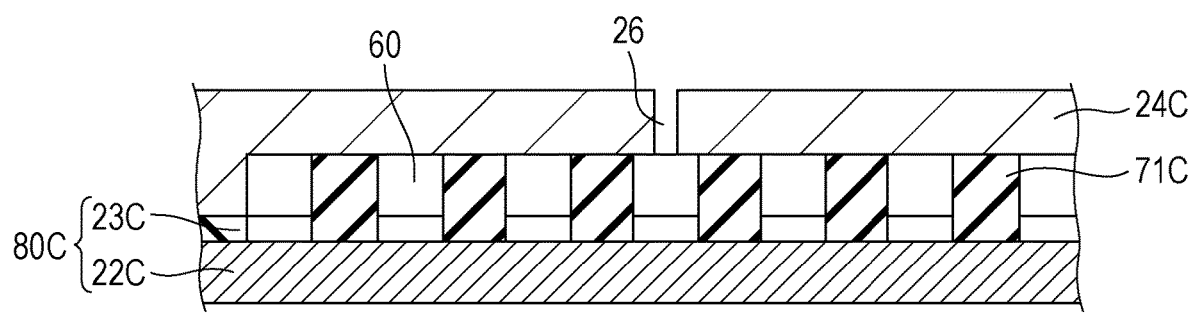
FIG. 4B is a view illustrating an example electrochemical hydrogen pump in Example 2 according to the first embodiment.

FIG. 4B is a view illustrating an example electrochemical hydrogen pump in Example 2 according to the first embodiment. In FIG. 4B, a first pressure transmitting member in a first space 60 of an electrochemical hydrogen pump 100 is depicted.

In the example illustrated in FIG. 4B, the first pressure transmitting member is disposed between a cathode end plate 24C and a cathode plate member 80C and includes columnar members 71C separated from the cathode end plate 24C. In this example, the columnar members 71C are disposed between the cathode end plate 24C and a cathode power supply plate 22C. Specifically, the columnar members 71C are arranged at regular intervals in a planar manner in the first space 60. First end portions of the columnar members 71C are in contact with the bottom surface of a recess in a central portion of the cathode end plate 24C, and second end portions are in contact with the cathode power supply plate 22C. Since the columnar members 71C are in contact with the cathode end plate 24C and the cathode power supply plate 22C through an opening in a central portion of a cathode insulating plate 23C in this example, the columnar members 71C are insulating members. This configuration avoids the short circuit between the cathode end plate 24C and the cathode power supply plate 22C. The cross-sectional shape of the columnar members 71C may be circular or rectangular.

In the electrochemical hydrogen pump 100 in Example 2, this configuration enables the pressure from the cathode power supply plate 22C to be appropriately transmitted to the cathode end plate 24C through the insulating columnar members 71C disposed between the cathode end plate 24C and the cathode power supply plate 22C.

In the electrochemical hydrogen pump 100 in Example 2, hydrogen ($H_2$) can flow through the first space 60 through voids present between adjacent columnar members 71C.

In the electrochemical hydrogen pump 100 in Example 2 when including elastic members as the columnar members 71C, the columnar members 71C may expand and contract in response to the deformation of the cathode power supply plate 22C if the cathode power supply plate 22C undergoes deformation due to the compression stress of the cathode gas diffusion layer 14. Thus, the pressure from the cathode power supply plate 22C is uniformly transmitted to the cathode end plate 24C through the columnar members 71C.

The electrochemical hydrogen pump 100 in Example 2 may be the same as the electrochemical hydrogen pump 100 according to the first embodiment except for the foregoing features.

Example 3

Figure 4C:
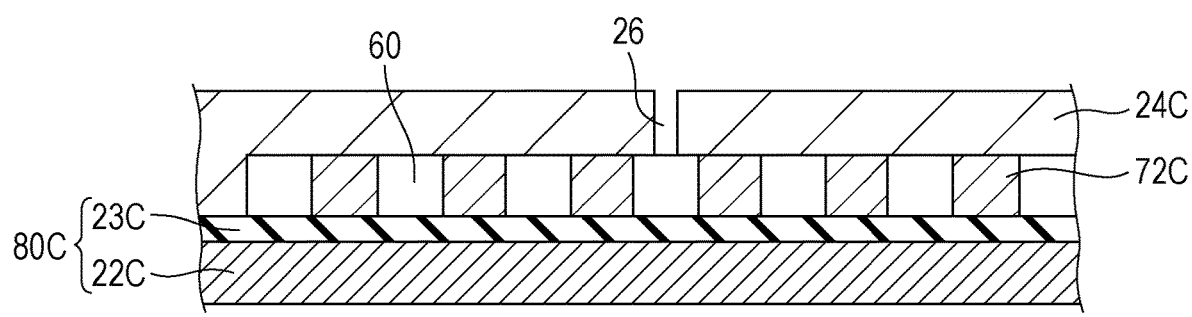
FIG. 4C is a view illustrating an example electrochemical hydrogen pump in Example 3 according to the first embodiment.

FIG. 4C is a view illustrating an example electrochemical hydrogen pump in Example 3 according to the first embodiment. In FIG. 4C, a first pressure transmitting member in a first space 60 of an electrochemical hydrogen pump 100 is depicted.

In the example illustrated in FIG. 4C, the first pressure transmitting member is disposed between a cathode end plate 24C and a cathode plate member 80C and includes columnar members 72C separated from the cathode end plate 24C. In this example, the columnar members 72C are disposed between the cathode end plate 24C and a cathode insulating plate 23C. Specifically, the columnar members 72C are arranged at regular intervals in a planar manner in the first space 60. First end portions of the columnar members 72C are in contact with the bottom surface of a recess in a central portion of the cathode end plate 24C, and second end portions are in contact with the cathode insulating plate 23C.

In the electrochemical hydrogen pump 100 in Example 3, this configuration enables the pressure from the cathode insulating plate 23C to be appropriately transmitted to the cathode end plate 24C through the columnar members 72C disposed between the cathode end plate 24C and the cathode insulating plate 23C.

In the electrochemical hydrogen pump 100 in Example 3, hydrogen (H2) can flow through the first space 60 through voids present between adjacent columnar members 72C.

In the electrochemical hydrogen pump 100 in Example 3 when including elastic members as the columnar members 72C, the columnar members 72C may expand and contract in response to the deformation of the cathode insulating plate 23C if the cathode insulating plate 23C undergoes deformation due to the compression stress of the cathode gas diffusion layer 14. Thus, the pressure from the cathode insulating plate 23C is uniformly transmitted to the cathode end plate 24C through the columnar members 72C.

The electrochemical hydrogen pump 100 in Example 3 may be the same as the electrochemical hydrogen pump 100 according to the first embodiment except for the foregoing features.

Example 4

Figure 4D:
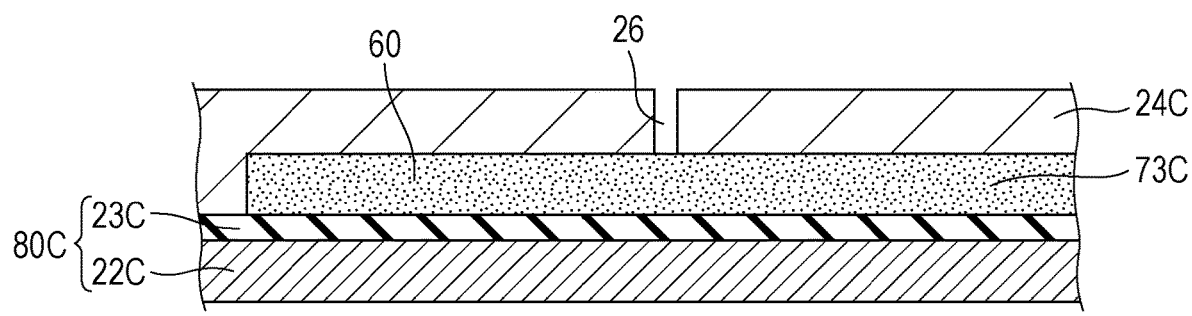
FIG. 4D is a view illustrating an example electrochemical hydrogen pump in Example 4 according to the first embodiment.

FIG. 4D is a view illustrating an example electrochemical hydrogen pump in Example 4 according to the first embodiment. In FIG. 4D, a first pressure transmitting member in a first space 60 of an electrochemical hydrogen pump 100 is depicted.

In the example illustrated in FIG. 4D, the first pressure transmitting member includes a porous member 73C. The first pressure transmitting member has any structure as long as it includes the porous member 73C.

For example, as illustrated in FIG. 4D, the porous member 73C having a plate shape is disposed in substantially the entire region in a recess (first space 60) in a central portion of a cathode end plate 24C. A first main surface of the porous member 73C is in contact with the bottom surface of the recess, and a second main surface of the porous member 73C is in contact with the main surface of the cathode insulating plate 23C.

Examples of the base material of the porous member 73C include the base material of the anode gas diffusion layer 15. In other words, in this case, the first pressure transmitting member has rigidity as high as the anode gas diffusion layer 15 included in the anode AN. Since the first pressure transmitting member has high rigidity, the pressure from the cathode plate member 80C can suppress the displacement of the first pressure transmitting member and can further suppress the displacement of the cathode plate member 80C toward the first space 60.

In the electrochemical hydrogen pump 100 in Example 4, this configuration enables the pressure from the cathode insulating plate 23C to be appropriately transmitted to the cathode end plate 24C through the porous member 73C disposed between the cathode end plate 24C and the cathode insulating plate 23C. In particular, since the pressure from the cathode insulating plate 23C is transmitted to the cathode end plate 24C through substantially the entire main surface of the porous member 73C in the electrochemical hydrogen pump 100 in Example 4, the bending of the cathode insulating plate 23C toward the cathode end plate 24C can be suppressed effectively. This configuration can suppress extension of the cathode gas diffusion layer 14 toward the cathode end plate 24C.

In the electrochemical hydrogen pump 100 in Example 4, the use of the porous member 73C as the first pressure transmitting member can appropriately ensure gas permeability in the first space 60 even when the porous member 73C is disposed in substantially the entire region in the first space 60, as illustrated in FIG. 4D.

The electrochemical hydrogen pump 100 in Example 4 may be the same as the electrochemical hydrogen pump 100 according to the first embodiment except for the foregoing features.

Example 5

Figure 4E:
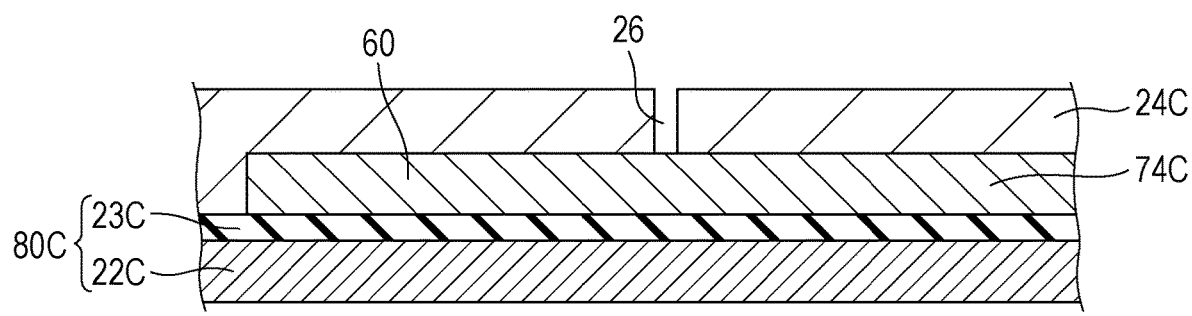
FIG. 4E is a view illustrating an example electrochemical hydrogen pump in Example 5 according to the first embodiment.

FIG. 4E is a view illustrating an example electrochemical hydrogen pump in Example 5 according to the first embodiment. In FIG. 4E, a first pressure transmitting member in a first space 60 of an electrochemical hydrogen pump 100 is depicted.

In the example illustrated in FIG. 4E, the first pressure transmitting member includes an elastic member 74C. The first pressure transmitting member has any structure as long as it includes the elastic member 74C.

For example, as illustrated in FIG. 4E, the elastic member 74C having a plate shape is disposed in substantially the entire region in a recess (first space 60) in a central portion of a cathode end plate 24C. A first main surface of the elastic member 74C is in contact with the bottom surface of the recess, and a second main surface of the elastic member 74C is in contact with the main surface of the cathode insulating plate 23C.

Examples of the base material of the elastic member 74C include the base material of the cathode gas diffusion layer 14. In other words, in this case, the first pressure transmitting member has rigidity as high as the cathode gas diffusion layer 14 included in the cathode CA.

In the electrochemical hydrogen pump 100 in Example 5, this configuration enables the pressure from the cathode insulating plate 23C to be appropriately transmitted to the cathode end plate 24C through the elastic member 74C disposed between the cathode end plate 24C and the cathode insulating plate 23C. In particular, since the pressure from the cathode insulating plate 23C is transmitted to the cathode end plate 24C through substantially the entire main surface of the elastic member 74C in the electrochemical hydrogen pump 100 in Example 5, the bending of the cathode insulating plate 23C toward the cathode end plate 24C can be suppressed effectively.

In the electrochemical hydrogen pump 100 in Example 5 including the elastic member 74C as the first pressure transmitting member, the elastic member 74C may conform to the deformation of the cathode insulating plate 23C if the cathode insulating plate 23C undergoes deformation due to the compression stress of the cathode gas diffusion layer 14. Thus, the pressure from the cathode insulating plate 23C is uniformly transmitted to the cathode end plate 24C through the elastic member 74C.

In the electrochemical hydrogen pump 100 in Example 5, the deformation of the cathode insulating plate 23C due to the compression stress of the cathode gas diffusion layer 14 is suppressed by the reaction force generated by the elastic deformation that occurs in the direction in which the thickness of the elastic member 74C having the same elastic modulus as the cathode gas diffusion layer 14 decreases. In other words, the amount of elastic deformation of the cathode gas diffusion layer 14 is substantially equal to the amount of elastic deformation of the elastic member 74C. The foregoing reaction force can be thus maintained appropriately when the cathode gas diffusion layer 14 elastically deforms in the direction in which the thickness after compression returns to the thickness before compression as the hydrogen pressure increasing operation of the electrochemical hydrogen pump 100 proceeds.

The electrochemical hydrogen pump 100 in Example 5 may be the same as the electrochemical hydrogen pump 100 according to the first embodiment except for the foregoing features.

Modifications

In the electrochemical hydrogen pump 100 according to this embodiment, the first space 60 is formed by a recess in a central portion of the cathode end plate 24C. However, the first space 60 is illustrative, and the present invention is not limited to this example. Other examples of the first space will be described below with reference to the drawings.

Modification 1

Figure 5A:
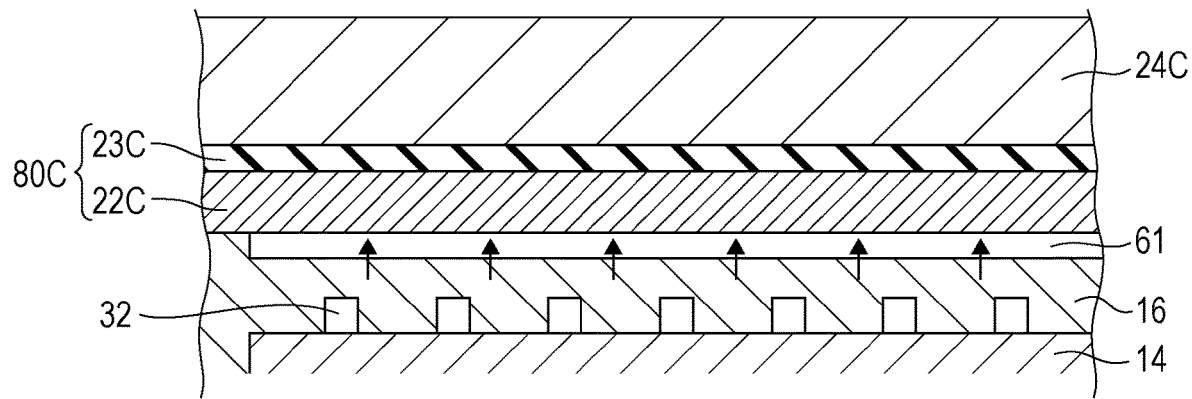
FIG. 5A is a view illustrating an example electrochemical hydrogen pump in Modification 1 according to the first embodiment.

FIG. 5A is a view illustrating an example electrochemical hydrogen pump in Modification 1 according to the first embodiment. In FIG. 5A, a first space 61 disposed between a cathode end plate 24C and a cathode separator 16 positioned in a second end is depicted.

In the example illustrated in FIG. 5A, the first space 61 is formed by a recess in a central portion of the cathode separator 16 and disposed in a contact section between the cathode separator 16 and a cathode power supply plate 22C. In other words, the first space 61 is defined by the recess in the central portion of the cathode separator 16 and the cathode power supply plate 22C.

In the first space 61, a first pressure transmitting member that transmits a pressure from the cathode separator 16 to the cathode end plate 24C is disposed. Specific examples of the first pressure transmitting member are the same as those in the electrochemical hydrogen pumps 100 in Example 1 to Example 5 according to the first embodiment, and description of specific examples is thus omitted. The operation and effect of the electrochemical hydrogen pump 100 in Modification 1 are the same as the operation and effect of the electrochemical hydrogen pump 100 according to the first embodiment, and detailed description of the operation and effect is thus omitted.

The electrochemical hydrogen pump 100 in Modification 1 may be the same as the electrochemical hydrogen pump 100 according to any one of the first embodiment and Example 1 to Example 5 according to the first embodiment except for the foregoing features.

Modification 2

Figure 5B:
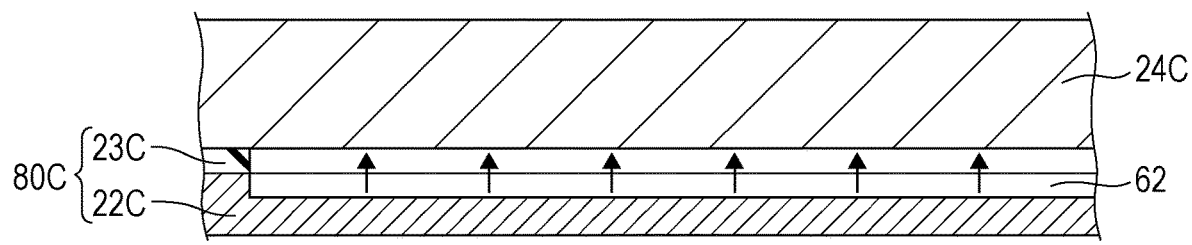
FIG. 5B is a view illustrating an example electrochemical hydrogen pump in Modification 2 according to the first embodiment.

FIG. 5B is a view illustrating an example electrochemical hydrogen pump in Modification 2 according to the first embodiment. In FIG. 5B, a first space 62 disposed between a cathode end plate 24C and a cathode separator 16 positioned in a second end is depicted.

In the example illustrated in FIG. 5B, the first space 62 is formed by a recess in a central portion of a cathode power supply plate 22C and an opening in a central portion of a cathode insulating plate 23C. In other words, the first space 62 is defined by the recess in the central portion of the cathode power supply plate 22C, the opening in the central portion of the cathode insulating plate 23C, and the cathode end plate 24C.

In the first space 62, a first pressure transmitting member that transmits a pressure from the cathode separator 16 to the cathode end plate 24C is disposed. Specific examples of the first pressure transmitting member are the same as those in the electrochemical hydrogen pumps 100 in Example 1 to Example 5 according to the first embodiment, and description of specific examples is thus omitted. Since the first pressure transmitting member is in contact with the cathode end plate 24C and the cathode power supply plate 22C through the opening in the central portion of the cathode insulating plate 23C in this example, the first pressure transmitting member is an insulating member. This configuration avoids the short circuit between the cathode end plate 24C and the cathode power supply plate 22C.

The operation and effect of the electrochemical hydrogen pump 100 in Modification 2 are the same as the operation and effect of the electrochemical hydrogen pump 100 according to the first embodiment, and detailed description of the operation and effect is thus omitted.

The electrochemical hydrogen pump 100 in Modification 2 may be the same as the electrochemical hydrogen pump 100 according to any one of the first embodiment and Example 1 to Example 5 according to the first embodiment except for the foregoing features.

Modification 3

Figure 5C:
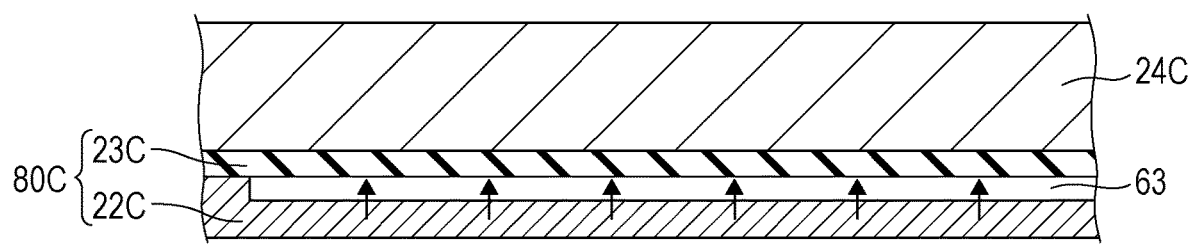
FIG. 5C is a view illustrating an example electrochemical hydrogen pump in Modification 3 according to the first embodiment.

FIG. 5C is a view illustrating an example electrochemical hydrogen pump in Modification 3 according to the first embodiment. In FIG. 5C, a first space 63 disposed between a cathode end plate 24C and a cathode separator 16 positioned in a second end is depicted.

In the example illustrated in FIG. 5C, the first space 63 is formed by a recess in a central portion of a cathode power supply plate 22C. In other words, the first space 63 is defined by the recess in the central portion of the cathode power supply plate 22C and a cathode insulating plate 23C.

In the first space 63, a first pressure transmitting member that transmits a pressure from the cathode separator 16 to the cathode end plate 24C is disposed. Specific examples of the first pressure transmitting member are the same as those in the electrochemical hydrogen pumps 100 in Example 1 to Example 5 according to the first embodiment, and description of specific examples is thus omitted. The operation and effect of the electrochemical hydrogen pump 100 in Modification 3 are the same as the operation and effect of the electrochemical hydrogen pump 100 according to the first embodiment, and detailed description of the operation and effect is thus omitted.

The electrochemical hydrogen pump 100 in Modification 3 may be the same as the electrochemical hydrogen pump 100 according to any one of the first embodiment and Example 1 to Example 5 according to the first embodiment except for the foregoing features.

Second Embodiment

Figure 6:
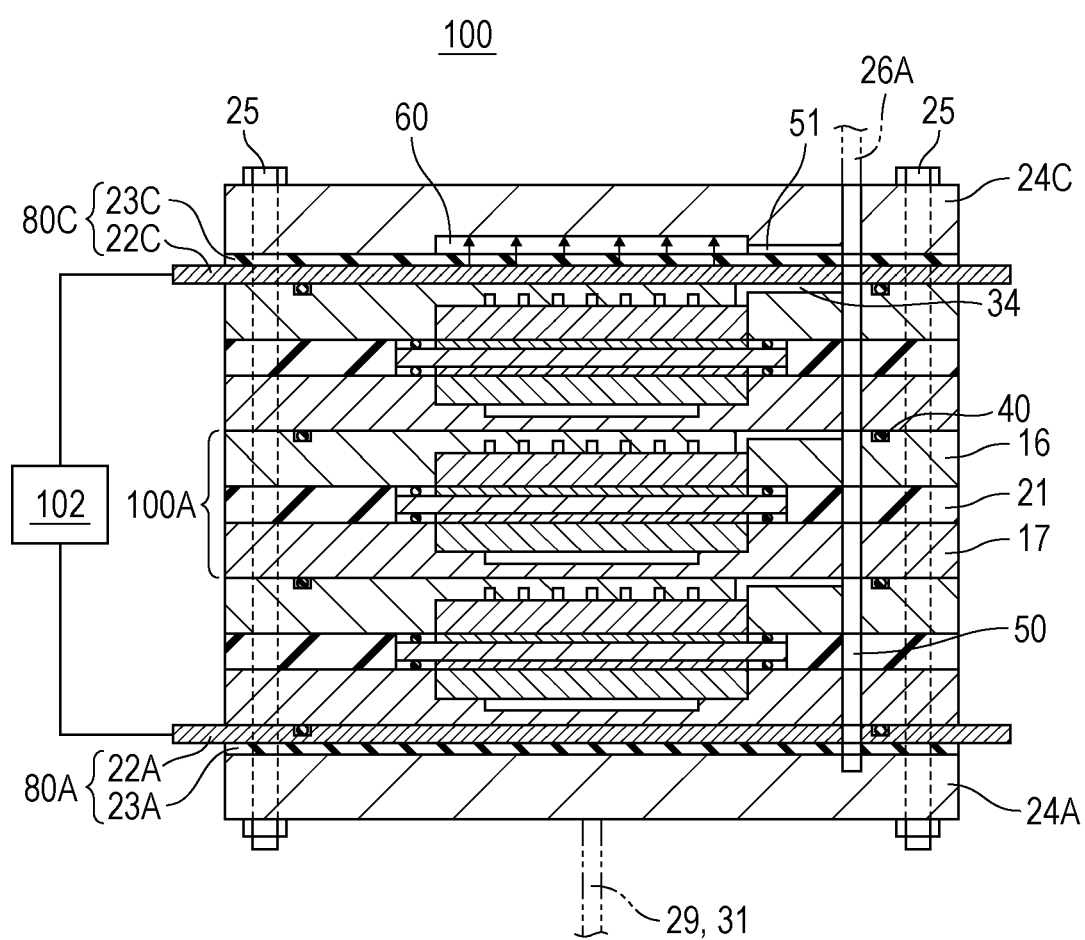
FIG. 6 is a view illustrating an example electrochemical hydrogen pump according to a second embodiment.

FIG. 6 is a view illustrating an example electrochemical hydrogen pump according to a second embodiment.

FIG. 6 illustrates the vertical cross-section of an electrochemical hydrogen pump 100 including a straight line that passes through the center of the electrochemical hydrogen pump 100 and the center of a cathode gas outlet manifold 50 in plan view.

The electrochemical hydrogen pump 100 according to this embodiment is the same as the electrochemical hydrogen pump 100 according to the first embodiment except for the arrangement position of a cathode gas outlet channel 26A described below.

In the electrochemical hydrogen pump 100 according to this embodiment, the cathode gas outlet channel 26A is guided so as to extend from the cathode gas outlet manifold 50 instead of being guided so as to extend from the inside of the first space 60 like the cathode gas outlet channel 26 illustrated in FIG. 2A.

In this case, the cathode gas outlet manifold 50 is formed by connection of through-holes in the members of the hydrogen pump unit 100A and the cathode end plate 24C and a non-through hole in the anode end plate 24A.

Accordingly, in the electrochemical hydrogen pump 100 according to this embodiment, high-pressure hydrogen generated in the cathode CA of the hydrogen pump unit 100A can be supplied to the first space 60 disposed between the cathode end plate 24C and the cathode separator 16 through the cathode gas outlet manifold 50 and the cathode gas supply channel 51. In other words, high-pressure hydrogen is retained in the first space 60.

The operation and effect of the electrochemical hydrogen pump 100 according to this embodiment are the same as the operation and effect of the electrochemical hydrogen pump 100 according to the first embodiment, and detailed description of the operation and effect is thus omitted.

The electrochemical hydrogen pump 100 according to this embodiment may be the same as the electrochemical hydrogen pump 100 according to any one of the first embodiment, Example 1 to Example 5 according to the first embodiment, and Modification 1 to Modification 3 according to the first embodiment, except for the foregoing features.

Third Embodiment

Figure 7:
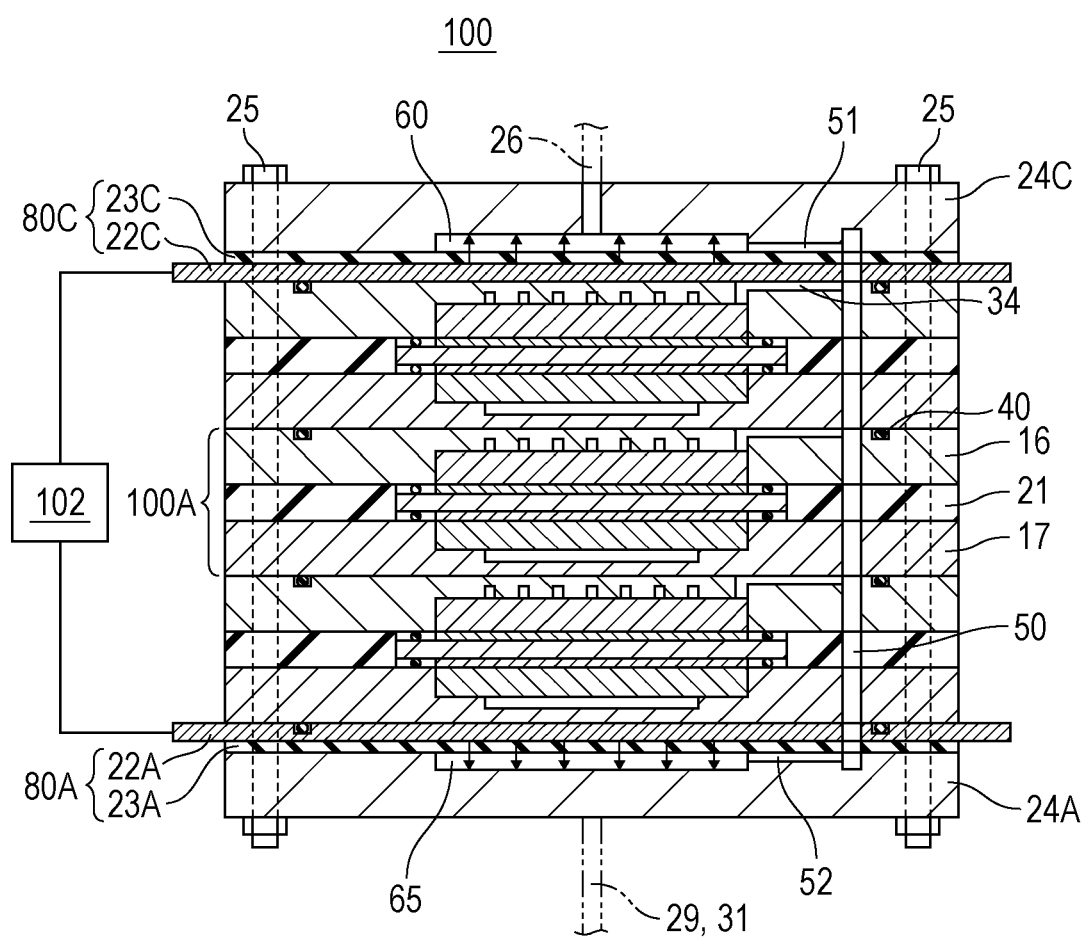
FIG. 7 is a view illustrating an example electrochemical hydrogen pump according to a third embodiment.

FIG. 7 is a view illustrating an example electrochemical hydrogen pump according to a third embodiment.

FIG. 7 illustrates the vertical cross-section of an electrochemical hydrogen pump 100 including a straight line that passes through the center of the electrochemical hydrogen pump 100 and the center of a cathode gas outlet manifold 50 in plan view.

The electrochemical hydrogen pump 100 according to this embodiment is the same as the electrochemical hydrogen pump 100 according to the first embodiment except that the electrochemical hydrogen pump 100 according to this embodiment includes a second space 65, a second gas flow channel, and a second pressure transmitting member described below.

As illustrated in FIG. 7, the electrochemical hydrogen pump 100 includes the second gas flow channel through which hydrogen generated in the cathode CA (see FIG. 2B) is supplied to the second space 65 disposed between an anode end plate 24A and an anode separator 17 positioned in the first end.

The second space 65 has any feature as long as the second space 65 is disposed between the anode end plate 24A and the anode separator 17 positioned in the first end. In the example illustrated in FIG. 7, the second space 65 is formed by a recess in a central portion of the anode end plate 24A. In other words, the second space 65 is defined by the recess in the central portion of the anode end plate 24A and the anode insulating plate 23A. Other examples of the second space will be described in Modifications.

In the electrochemical hydrogen pump 100 according to this embodiment, a second pressure transmitting member is provided in the second space 65 as indicated by the arrows in FIG. 7. The second pressure transmitting member may have any structure as long as it can transmit a pressure from the anode separator 17 positioned in the first end to the anode end plate 24A. Specific structures of the second pressure transmitting member will be described in Examples.

The second gas flow channel may have any structure as long as hydrogen generated in the cathode CA can be supplied to the second space 65 through the second gas flow channel. For example, in the electrochemical hydrogen pump 100 according to this embodiment, as illustrated in FIG. 7, the second gas flow channel includes a tubular cathode gas outlet manifold 50 and a cathode gas supply channel 52 through which the cathode gas outlet manifold 50 is in communication with the second space 65.

The cathode gas outlet manifold 50 is formed by connection of through-holes in the members of the hydrogen pump unit 100A and non-through holes in the anode end plate 24A and the cathode end plate 24C, as in the first embodiment.

The cathode gas supply channel 52 is formed by a groove that is provided in the main surface of the anode end plate 24A and through which the inside of the recess (second space 65) of the anode end plate 24A is in communication with a first end portion of the cathode gas outlet manifold 50.

In the electrochemical hydrogen pump 100 according to this embodiment having this configuration, the increase of contact resistance between the cathode gas diffusion layer 14 and the electrolyte membrane 11 (cathode catalyst layer 12) in the hydrogen pump unit 100A when the gas pressure of the cathode CA increases is suppressed in the following manner.

On the basis of the hydrogen gas pressure in the cathode CA of the hydrogen pump unit 100A, a load is transmitted to the anode AN and the anode separator 17. When the hydrogen gas pressure in the cathode CA of the hydrogen pump unit 100A is high, the anode separator 17 may be deformed by being pressed outward under this load. If the elastic deformation in the direction in which the thickness of the cathode gas diffusion layer 14 increases cannot conform to the deformation of the anode separator 17, a gap may be generated between the cathode gas diffusion layer 14 and the electrolyte membrane 11 (cathode catalyst layer 12) of the hydrogen pump unit 100A. As a result, the contact resistance between the cathode gas diffusion layer 14 and the electrolyte membrane 11 (cathode catalyst layer 12) of the hydrogen pump unit 100A may increase.

However, in the electrochemical hydrogen pump 100 according to this embodiment, high-pressure hydrogen generated in the cathode CA of the hydrogen pump unit 100A can be supplied to the second space 65 disposed between the anode end plate 24A and the anode separator 17 through the cathode gas outlet manifold 50 and the cathode gas supply channel 52. Therefore, the hydrogen gas pressure in the second space 65 is substantially the same as the hydrogen gas pressure in the cathode CA of the hydrogen pump unit 100A. The load applied to the anode separator 17 by hydrogen in the second space 65 acts so as to prevent or reduce the deformation of the anode separator 17 due to the hydrogen gas pressure in the cathode CA. Since a gap is unlikely to form between the cathode gas diffusion layer 14 and the electrolyte membrane 11 (cathode catalyst layer 12) of the hydrogen pump unit 100A in the electrochemical hydrogen pump 100 according to this embodiment compared with the case without the second space 65, the increase of contact resistance between the cathode gas diffusion layer 14 and the electrolyte membrane 11 (cathode catalyst layer 12) can be suppressed appropriately.

In the electrochemical hydrogen pump 100 according to this embodiment, the increase of contact resistance between the cathode gas diffusion layer 14 and the electrolyte membrane 11 (cathode catalyst layer 12) of the hydrogen pump unit due to the compression stress of the cathode gas diffusion layer 14 acting on the anode separator 17 can be suppressed in the following manner.

In the elastic deformation in the direction in which the thickness of the cathode gas diffusion layer 14 decreases, the compression stress of the cathode gas diffusion layer 14 acts through the cathode catalyst layer 12, the electrolyte membrane 11, the anode catalyst layer 13, and the anode gas diffusion layer 15 in the direction in which the anode separator 17 is pressed toward the second space 65. If the second pressure transmitting member that transmits a pressure from the anode separator 17 to the anode end plate 24A is not disposed in the second space 65, the anode separator 17 tends to bend toward the anode end plate 24A. If the elastic deformation in the direction in which the thickness of the cathode gas diffusion layer 14 increases cannot conform to the deformation of the anode separator 17, a gap may be generated between the cathode gas diffusion layer 14 and the electrolyte membrane 11 (cathode catalyst layer 12) of the hydrogen pump unit 100A. As a result, the contact resistance between the cathode gas diffusion layer 14 and the electrolyte membrane 11 (cathode catalyst layer 12) of the hydrogen pump unit 100A may increase.

However, in the electrochemical hydrogen pump 100 according to this embodiment, the disposition of, in the second space 65, the second pressure transmitting member that transmits a pressure from the anode separator 17 to the anode end plate 24A, as described above, makes it difficult for the anode separator 17 to bend toward the anode end plate 24A in the elastic deformation in the direction in which the thickness of the cathode gas diffusion layer 14 decreases. Since a gap is unlikely to form between the cathode gas diffusion layer 14 and the electrolyte membrane 11 (cathode catalyst layer 12) of the hydrogen pump unit 100A in the electrochemical hydrogen pump 100 according to this embodiment compared with the case without the second pressure transmitting member in the second space 65, the increase of contact resistance between the cathode gas diffusion layer 14 and the electrolyte membrane 11 (cathode catalyst layer 12) can be suppressed appropriately.

In the case where the electrolyte membrane 11 is, for example, a polymer electrolyte membrane, the polymer electrolyte membrane exhibits desired proton conductivity in the wet condition. To maintain the efficiency of the hydrogen pressure increasing operation of the electrochemical hydrogen pump 100 at a desired value, the electrolyte membrane 11 needs to be kept wet. If the anode gas flow channel 33 (see FIG. 2B) of the anode separator 17 or the like is blocked with water in this case, the hydrogen supply of the hydrogen pump unit 100A is inhibited. In other words, a stable flow of hydrogen passing through the anode gas flow channel 33 is an important factor for efficient hydrogen pressure increasing operation of the electrochemical hydrogen pump 100. From such a viewpoint, in the electrochemical hydrogen pump 100 according to this embodiment, the anode separator 17 is unlikely to deform regardless of the gas pressure of hydrogen generated in the cathode CA of the hydrogen pump unit 100A, which can appropriately stabilize the flow of hydrogen passing through the anode gas flow channel 33 of the anode separator 17, compared with the case without the second space 65 and the case without the second pressure transmitting member in the second space 65.

In the example illustrated in FIG. 7, the first space 60 is situated opposite to the second space 65 in the electrochemical hydrogen pump 100.

With this configuration, the load applied to the cathode separator 16 by hydrogen in the first space 60 and the load applied to the anode separator 17 by hydrogen in the second space 65 act so as to uniformly suppress, in the plane from the opposite end portions of the hydrogen pump unit 100A, the deformation of the members of the hydrogen pump unit 100A due to the hydrogen gas pressure in the cathode CA.

Therefore, in the electrochemical hydrogen pump 100 according to this embodiment, the deformation of the members of the hydrogen pump unit 100A can be effectively suppressed compared with the case where the first space 60 is not situated opposite to the second space 65.

In the example illustrated in FIG. 7, the second space 65 is parallel to the main surface of the anode AN (see FIG. 2B) in the electrochemical hydrogen pump 100.

The load transmitted to the anode separator 17 can be thus uniformly distributed in the plane of the anode separator 17 on the basis of the hydrogen gas pressure in the second space 65. Therefore, the electrochemical hydrogen pump 100 according to this embodiment effectively operates in such a manner that the load applied to the anode separator 17 by hydrogen in the second space 65 prevents or reduces deformation (bending) of the anode separator 17 compared with the case where the second space 65 is not parallel to the main surface of the anode AN.

In the example illustrated in FIG. 7, the opening area of the second space 65 in the direction parallel to the main surface of the anode separator 17 in the electrochemical hydrogen pump 100 is larger than or equal to the area of the main surface of the anode AN (see FIG. 2B). However, the opening area of such a second space 65 is smaller than or equal to the area of the main surface of the anode separator 17.

If the opening area of the second space 65 in the direction parallel to the main surface of the anode separator 17 is smaller than the area of the main surface of the anode AN, there is a possibility that a portion of the anode separator 17 that faces the anode AN and is not covered with the second space 65 may undergo deformation due to the hydrogen gas pressure in the cathode CA.

However, in the electrochemical hydrogen pump 100 according to this embodiment, the entire region of the main surface of the anode AN can be covered with the second space 65 by setting the opening area of the second space 65 to the area of the main surface of the anode AN or larger. Thus, the load is transmitted to the entire region of the anode separator 17 facing the anode AN on the basis of the hydrogen gas pressure in the second space 65, which can reduce the above-described possibility.

The electrochemical hydrogen pump 100 according to this embodiment may be the same as the electrochemical hydrogen pump 100 according to any one of the first embodiment, Example 1 to Example 5 according to the first embodiment, Modification 1 to Modification 3 according to the first embodiment, and the second embodiment, except for the foregoing features.

EXAMPLES

Specific structures of the second pressure transmitting member will be described below with reference to the drawings.

Example 1

Figure 8A:
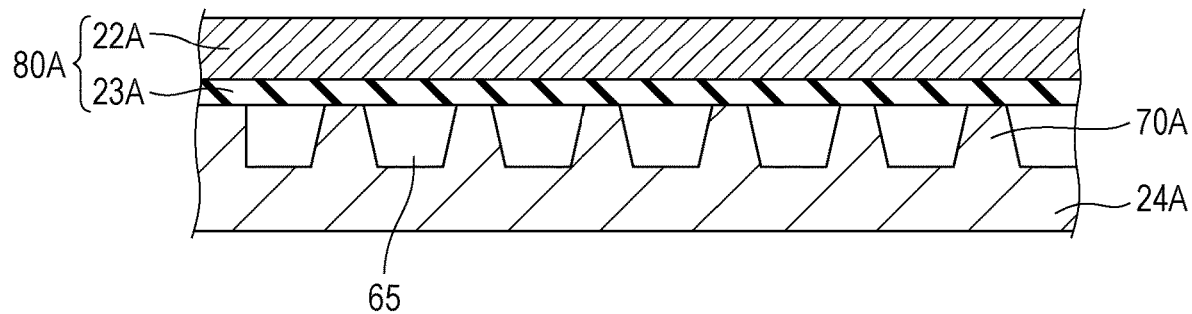
FIG. 8A is a view illustrating an example electrochemical hydrogen pump in Example 1 according to the third embodiment.

FIG. 8A is a view illustrating an example electrochemical hydrogen pump in Example 1 according to the third embodiment. In FIG. 8A, a second pressure transmitting member in a second space 65 of an electrochemical hydrogen pump 100 is depicted.

In the example illustrated in FIG. 8A, the second pressure transmitting member is disposed between an anode end plate 24A and an anode plate member 80A and includes columnar members 70A integrated with the anode end plate 24A. In this example, the columnar members 70A are disposed between the anode end plate 24A and an anode insulating plate 23A. Specifically, the columnar members 70A integrated with the anode end plate 24A are arranged at regular intervals in a planar manner in the second space 65, and the end portions of the columnar members 70A are in contact with the anode insulating plate 23A. The cross-sectional shape of the columnar members 70A may be circular or rectangular.

In the electrochemical hydrogen pump 100 in Example 1, this configuration enables the pressure from the anode insulating plate 23A to be appropriately transmitted to the anode end plate 24A through the columnar members 70A disposed between the anode end plate 24A and the anode insulating plate 23A. In the electrochemical hydrogen pump 100 in Example 1, hydrogen (H2) can be retained in voids present between adjacent columnar members 70A in the second space 65.

The electrochemical hydrogen pump 100 according to Example 1 may be the same as the electrochemical hydrogen pump 100 according to any one of the first embodiment, Example 1 to Example 5 according to the first embodiment, Modification 1 to Modification 3 according to the first embodiment, the second embodiment, and the third embodiment, except for the foregoing features.

Example 2

Figure 8B:
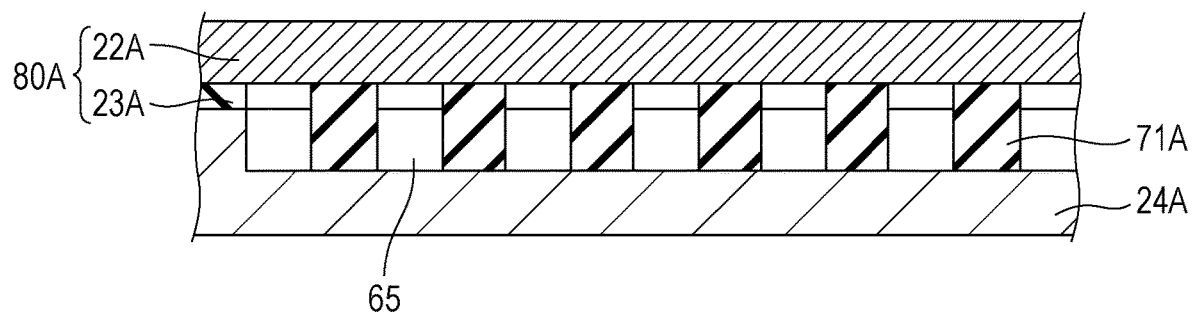
FIG. 8B is a view illustrating an example electrochemical hydrogen pump in Example 2 according to the third embodiment.

FIG. 8B is a view illustrating an example electrochemical hydrogen pump in Example 2 according to the third embodiment. In FIG. 8B, a second pressure transmitting member in a second space 65 of an electrochemical hydrogen pump 100 is depicted.

In the example illustrated in FIG. 8B, the second pressure transmitting member is disposed between an anode end plate 24A and an anode plate member 80A and includes columnar members 71A separated from the anode end plate 24A. In this example, columnar members 71A are disposed between the anode end plate 24A and an anode power supply plate 22A. Specifically, the columnar members 71A are arranged at regular intervals in a planar manner in the second space 65. First end portions of the columnar members 71A are in contact with the bottom surface of a recess in a central portion of the anode end plate 24A, and second end portions are in contact with the anode power supply plate 22A. Since the columnar members 71A are in contact with the anode end plate 24A and the anode power supply plate 22A through an opening in a central portion of an anode insulating plate 23A in this example, the columnar members 71A are insulating members. This configuration avoids the short circuit between the anode end plate 24A and the anode power supply plate 22A. The cross-sectional shape of the columnar members 71A may be circular or rectangular.

In the electrochemical hydrogen pump 100 in Example 2, this configuration enables the pressure from the anode power supply plate 22A to be appropriately transmitted to the anode end plate 24A through the insulating columnar members 71A disposed between the anode end plate 24A and the anode power supply plate 22A.

In the electrochemical hydrogen pump 100 in Example 2, hydrogen (H2) can be retained in voids present between adjacent columnar members 71A in the second space 65.

In the electrochemical hydrogen pump 100 in Example 2 when including elastic members as the columnar members 71A, the columnar members 71A may expand and contract in response to the deformation of the anode power supply plate 22A if the anode power supply plate 22A undergoes deformation due to the compression stress of the cathode gas diffusion layer 14. Thus, the pressure from the anode power supply plate 22A is uniformly transmitted to the anode end plate 24A through the columnar members 71A.

The electrochemical hydrogen pump 100 according to Example 2 may be the same as the electrochemical hydrogen pump 100 according to any one of the first embodiment, Example 1 to Example 5 according to the first embodiment, Modification 1 to Modification 3 according to the first embodiment, the second embodiment, and the third embodiment, except for the foregoing features.

Example 3

Figure 8C:
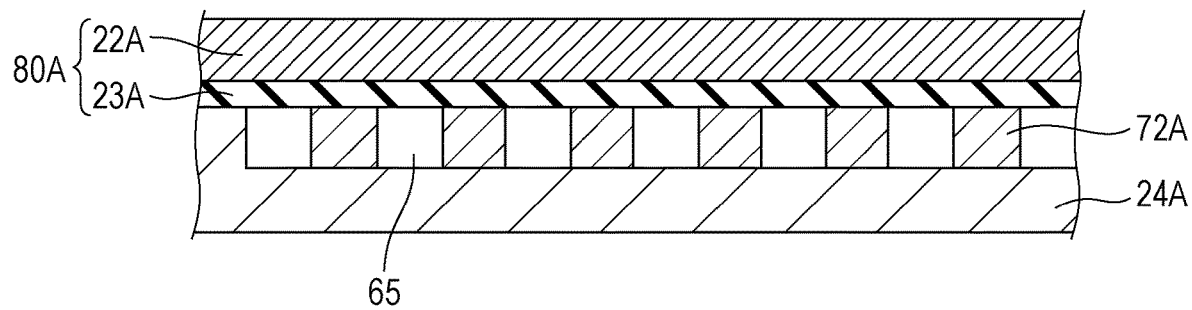
FIG. 8C is a view illustrating an example electrochemical hydrogen pump in Example 3 according to the third embodiment.

FIG. 8C is a view illustrating an example electrochemical hydrogen pump in Example 3 according to the third embodiment. In FIG. 8C, a second pressure transmitting member in a second space 65 of an electrochemical hydrogen pump 100 is depicted.

In the example illustrated in FIG. 8C, the second pressure transmitting member is disposed between an anode end plate 24A and an anode plate member 80A and includes columnar members 72A separated from the anode end plate 24A. In this example, the columnar members 72A are disposed between the anode end plate 24A and an anode insulating plate 23A. Specifically, the columnar members 72A are arranged at regular intervals in a planar manner in the second space 65. First end portions of the columnar members 72A are in contact with the bottom surface of a recess in a central portion of the anode end plate 24A, and second end portions are in contact with the anode insulating plate 23A.

In the electrochemical hydrogen pump 100 in Example 3, this configuration enables the pressure from the anode insulating plate 23A to be appropriately transmitted to the anode end plate 24A through the columnar members 72A disposed between the anode end plate 24A and the anode insulating plate 23A.

In the electrochemical hydrogen pump 100 in Example 3, hydrogen (H2) can be retained in voids present between adjacent columnar members 72A in the second space 65.

In the electrochemical hydrogen pump 100 in Example 3 when including elastic members as the columnar members 72A, the columnar members 72A may expand and contract in response to the deformation of the anode insulating plate 23A if the anode insulating plate 23A undergoes deformation due to the compression stress of the cathode gas diffusion layer 14. Thus, the pressure from the anode insulating plate 23A is uniformly transmitted to the anode end plate 24A through the columnar members 72A.

The electrochemical hydrogen pump 100 according to Example 3 may be the same as the electrochemical hydrogen pump 100 according to any one of the first embodiment, Example 1 to Example 5 according to the first embodiment, Modification 1 to Modification 3 according to the first embodiment, the second embodiment, and the third embodiment, except for the foregoing features.

Example 4

Figure 8D:
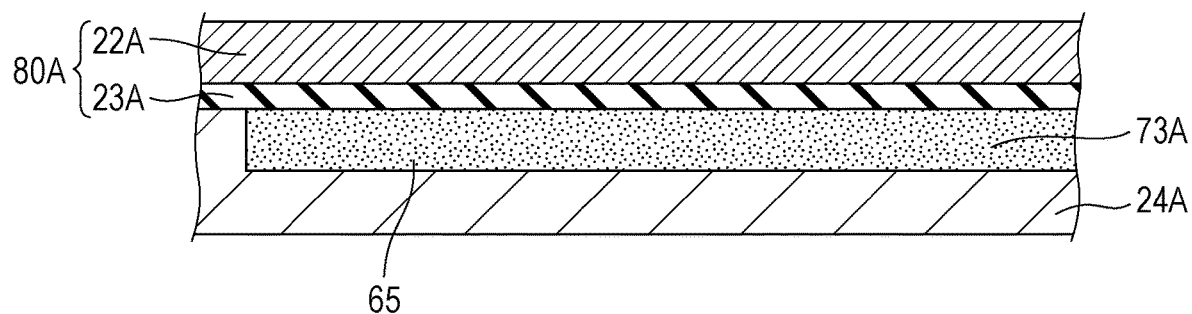
FIG. 8D is a view illustrating an example electrochemical hydrogen pump in Example 4 according to the third embodiment.

FIG. 8D is a view illustrating an example electrochemical hydrogen pump in Example 4 according to the third embodiment. In FIG. 8D, a second pressure transmitting member in a second space 65 of an electrochemical hydrogen pump 100 is depicted.

In the example illustrated in FIG. 8D, the second pressure transmitting member includes a porous member 73A. The second pressure transmitting member has any structure as long as it includes the porous member 73A.

For example, as illustrated in FIG. 8D, the porous member 73A having a plate shape is disposed in substantially the entire region in a recess (second space 65) in a central portion of an anode end plate 24A. A first main surface of the porous member 73A is in contact with the bottom surface of the recess, and a second main surface of the porous member 73A is in contact with the main surface of the anode insulating plate 23A.

Examples of the base material of the porous member 73A include the base material of the anode gas diffusion layer 15. In other words, in this case, the second pressure transmitting member has rigidity as high as the anode gas diffusion layer 15 included in the anode AN.

In the electrochemical hydrogen pump 100 in Example 4, this configuration enables the pressure from the anode insulating plate 23A to be appropriately transmitted to the anode end plate 24A through the porous member 73A disposed between the anode end plate 24A and the anode insulating plate 23A. In particular, since the pressure from the anode insulating plate 23A is transmitted to the anode end plate 24A through substantially the entire main surface of the porous member 73A in the electrochemical hydrogen pump 100 in Example 4, the bending of the anode insulating plate 23A toward the anode end plate 24A can be suppressed effectively.

In the electrochemical hydrogen pump 100 in Example 4, the use of the porous member 73A as the second pressure transmitting member can appropriately ensure gas permeability in the second space 65 even when the porous member 73A is disposed in substantially the entire region in the second space 65, as illustrated in FIG. 8D.

The electrochemical hydrogen pump 100 according to Example 4 may be the same as the electrochemical hydrogen pump 100 according to any one of the first embodiment, Example 1 to Example 5 according to the first embodiment, Modification 1 to Modification 3 according to the first embodiment, the second embodiment, and the third embodiment, except for the foregoing features.

Example 5

Figure 8E:
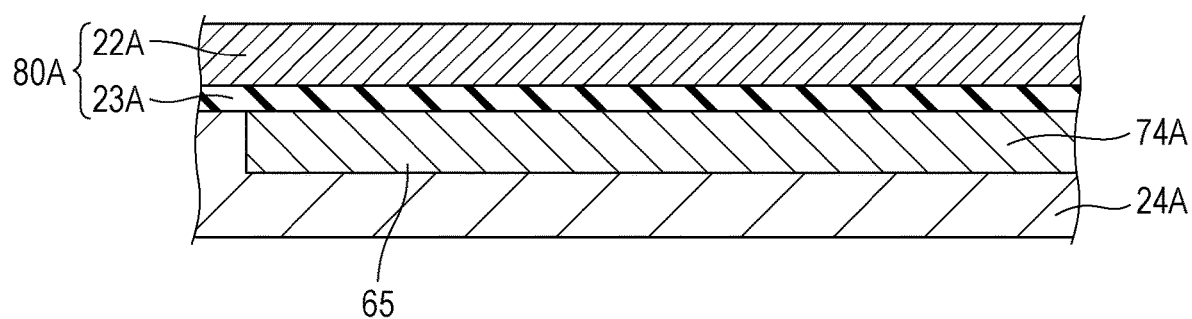
FIG. 8E is a view illustrating an example electrochemical hydrogen pump in Example 5 according to the third embodiment.

FIG. 8E is a view illustrating an example electrochemical hydrogen pump in Example 5 according to the third embodiment. In FIG. 8E, a second pressure transmitting member in a second space 65 of an electrochemical hydrogen pump 100 is depicted.

In the example illustrated in FIG. 8E, the second pressure transmitting member includes an elastic member 74A. The second pressure transmitting member has any structure as long as it includes the elastic member 74A.

For example, as illustrated in FIG. 8E, the elastic member 74A having a plate shape is disposed in substantially the entire region in a recess (second space 65) in a central portion of an anode end plate 24A. A first main surface of the elastic member 74A is in contact with the bottom surface of the recess, and a second main surface of the elastic member 74A is in contact with the main surface of the anode insulating plate 23A.

Examples of the base material of the elastic member 74A include the base material of the cathode gas diffusion layer 14. In other words, in this case, the second pressure transmitting member has rigidity as high as the cathode gas diffusion layer 14 included in the cathode CA.

In the electrochemical hydrogen pump 100 in Example 5, this configuration enables the pressure from the anode insulating plate 23A to be appropriately transmitted to the anode end plate 24A through the elastic member 74A disposed between the anode end plate 24A and the anode insulating plate 23A. In particular, since the pressure from the anode insulating plate 23A is transmitted to the anode end plate 24A through substantially the entire main surface of the elastic member 74A in the electrochemical hydrogen pump 100 in Example 5, the bending of the anode insulating plate 23A toward the anode end plate 24A can be suppressed effectively.

In the electrochemical hydrogen pump 100 in Example 5 including the elastic member 74A as the second pressure transmitting member, the elastic member 74A may conform to the deformation of the anode insulating plate 23A if the anode insulating plate 23A is deformed by the compression stress of the cathode gas diffusion layer 14. As a result, the pressure from the anode insulating plate 23A is uniformly transmitted to the anode end plate 24A through the elastic member 74A.

In the electrochemical hydrogen pump 100 in Example 5, the deformation of the anode insulating plate 23A due to the compression stress of the cathode gas diffusion layer 14 is suppressed by the reaction force generated by the elastic deformation that occurs in the direction in which the thickness of the elastic member 74A having the same elastic modulus as the cathode gas diffusion layer 14 decreases. In other words, the amount of elastic deformation of the cathode gas diffusion layer 14 is substantially equal to the amount of elastic deformation of the elastic member 74A. The foregoing reaction force can be thus maintained appropriately when the cathode gas diffusion layer 14 elastically deforms in the direction in which the thickness after compression returns to the thickness before compression as the hydrogen pressure increasing operation of the electrochemical hydrogen pump 100 proceeds.

The electrochemical hydrogen pump 100 according to Example 5 may be the same as the electrochemical hydrogen pump 100 according to any one of the first embodiment, Example 1 to Example 5 according to the first embodiment, Modification 1 to Modification 3 according to the first embodiment, the second embodiment, and the third embodiment, except for the foregoing features.

Modifications

In the electrochemical hydrogen pump 100 according to the third embodiment, the second space 65 is formed by a recess in a central portion of the anode end plate 24A. However, the second space 65 is illustrative, and the present invention is not limited to this example. Other examples of the second space will be described below with reference to the drawings.

Modification 1

Figure 9A:
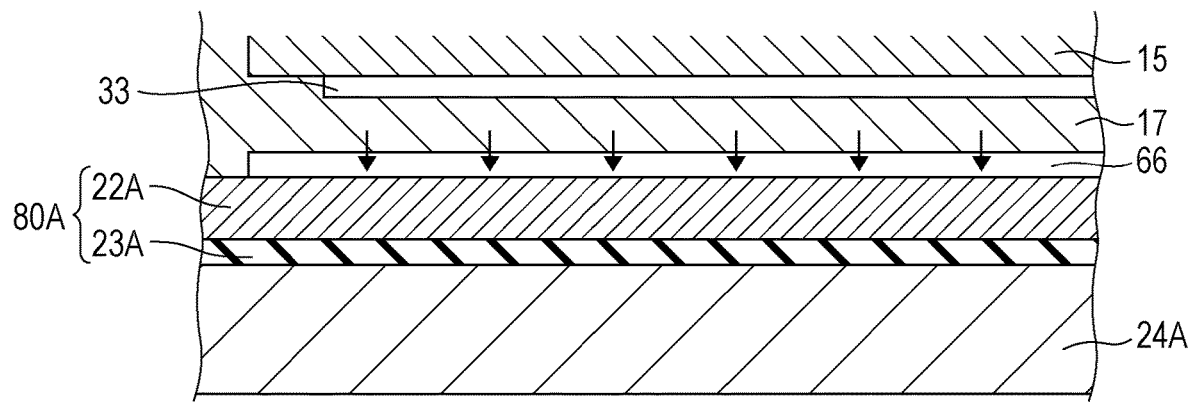
FIG. 9A is a view illustrating an example electrochemical hydrogen pump in Modification 1 according to the third embodiment.

FIG. 9A is a view illustrating an example electrochemical hydrogen pump in Modification 1 according to the third embodiment. In FIG. 9A, a second space 66 disposed between an anode end plate 24A and an anode separator 17 positioned in a first end is depicted.

In the example illustrated in FIG. 9A, the second space 66 is formed by a recess in a central portion of the anode separator 17 and disposed in a contact section between the anode separator 17 and an anode power supply plate 22A. In other words, the second space 66 is defined by the recess in the central portion of the anode separator 17 and the anode power supply plate 22A.

In the second space 66, a second pressure transmitting member that transmits a pressure from the anode separator 17 to the anode end plate 24A is disposed. Specific examples of the second pressure transmitting member are the same as those in the electrochemical hydrogen pumps 100 in Example 1 to Example 5 according to the third embodiment, and description of specific examples is thus omitted. The operation and effect of the electrochemical hydrogen pump 100 in Modification 1 are the same as the operation and effect of the electrochemical hydrogen pump 100 according to the third embodiment, and detailed description of the operation and effect is thus omitted.

The electrochemical hydrogen pump 100 according to Modification 1 may be the same as the electrochemical hydrogen pump 100 according to any one of the first embodiment, Example 1 to Example 5 according to the first embodiment, Modification 1 to Modification 3 according to the first embodiment, the second embodiment, the third embodiment, and Example 1 to Example 5 according to the third embodiment, except for the foregoing features.

Modification 2

Figure 9B:
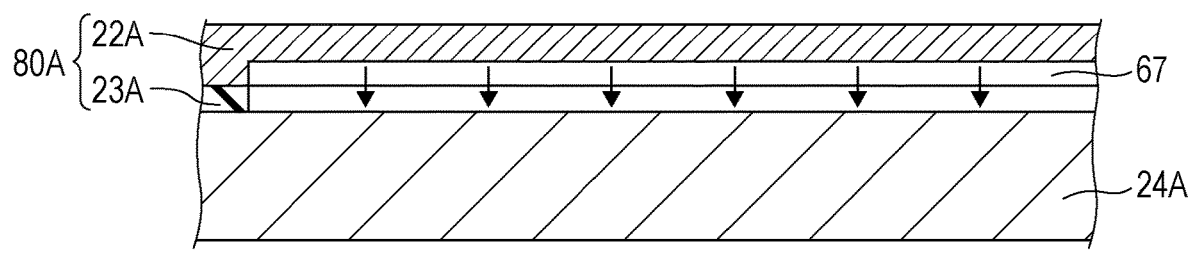
FIG. 9B is a view illustrating an example electrochemical hydrogen pump in Modification 2 according to the third embodiment.

FIG. 9B is a view illustrating an example electrochemical hydrogen pump in Modification 2 according to the third embodiment. In FIG. 9B, a second space 67 disposed between an anode end plate 24A and an anode separator 17 positioned in a first end is depicted.

In the example illustrated in FIG. 9B, the second space 67 is formed by a recess in a central portion of an anode power supply plate 22A and an opening in a central portion of an anode insulating plate 23A. In other words, the second space 67 is defined by the recess in the central portion of the anode power supply plate 22A, the opening in the central portion of the anode insulating plate 23A, and the anode end plate 24A.

In the second space 67, a second pressure transmitting member that transmits a pressure from the anode separator 17 to the anode end plate 24A is disposed. Specific examples of the second pressure transmitting member are the same as those in the electrochemical hydrogen pumps 100 in Example 1 to Example 5 according to the third embodiment, and description of specific examples is thus omitted. Since the second pressure transmitting member is in contact with the anode end plate 24A and the anode power supply plate 22A through the opening in the central portion of the anode insulating plate 23A in this example, the first pressure transmitting member is an insulating member. This configuration avoids the short circuit between the anode end plate 24A and the anode power supply plate 22A.

The operation and effect of the electrochemical hydrogen pump 100 in Modification 2 are the same as the operation and effect of the electrochemical hydrogen pump 100 according to the third embodiment, and detailed description of the operation and effect is thus omitted.

The electrochemical hydrogen pump 100 according to Modification 2 may be the same as the electrochemical hydrogen pump 100 according to any one of the first embodiment, Example 1 to Example 5 according to the first embodiment, Modification 1 to Modification 3 according to the first embodiment, the second embodiment, the third embodiment, and Example 1 to Example 5 according to the third embodiment, except for the foregoing features.

Modification 3

Figure 9C:
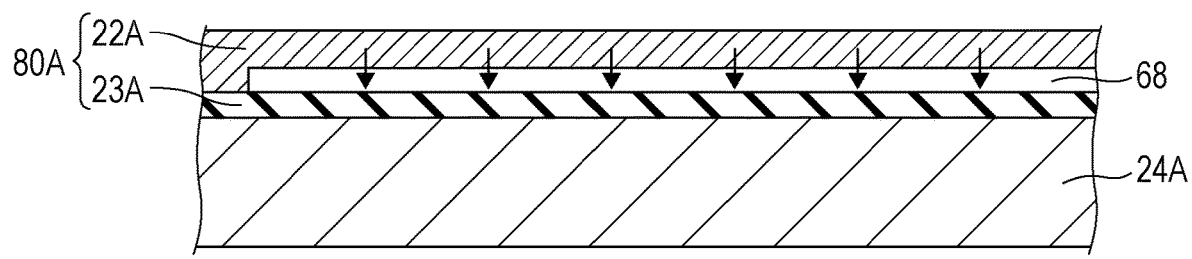
FIG. 9C is a view illustrating an example electrochemical hydrogen pump in Modification 3 according to the third embodiment.

FIG. 9C is a view illustrating an example electrochemical hydrogen pump in Modification 3 according to the third embodiment. In FIG. 9C, a second space 68 disposed between an anode end plate 24A and an anode separator 17 positioned in a first end is depicted.

In the example illustrated in FIG. 9C, the second space 68 is formed by a recess in a central portion of the anode power supply plate 22A. In other words, the second space 68 is defined by the recess in the central portion of the anode power supply plate 22A and the anode insulating plate 23A.

In the second space 68, a second pressure transmitting member that transmits a pressure from the anode separator 17 to the anode end plate 24A is disposed. Specific examples of the second pressure transmitting member are the same as those in the electrochemical hydrogen pumps 100 in Example 1 to Example 5 according to the third embodiment, and description of specific examples is thus omitted. The operation and effect of the electrochemical hydrogen pump 100 in Modification 3 are the same as the operation and effect of the electrochemical hydrogen pump 100 according to the third embodiment, and detailed description of the operation and effect is thus omitted.

The electrochemical hydrogen pump 100 according to Modification 2 may be the same as the electrochemical hydrogen pump 100 according to any one of the first embodiment, Example 1 to Example 5 according to the first embodiment, Modification 1 to Modification 3 according to the first embodiment, the second embodiment, the third embodiment, and Example 1 to Example 5 according to the third embodiment, except for the foregoing features.

Fourth Embodiment

Figure 10:
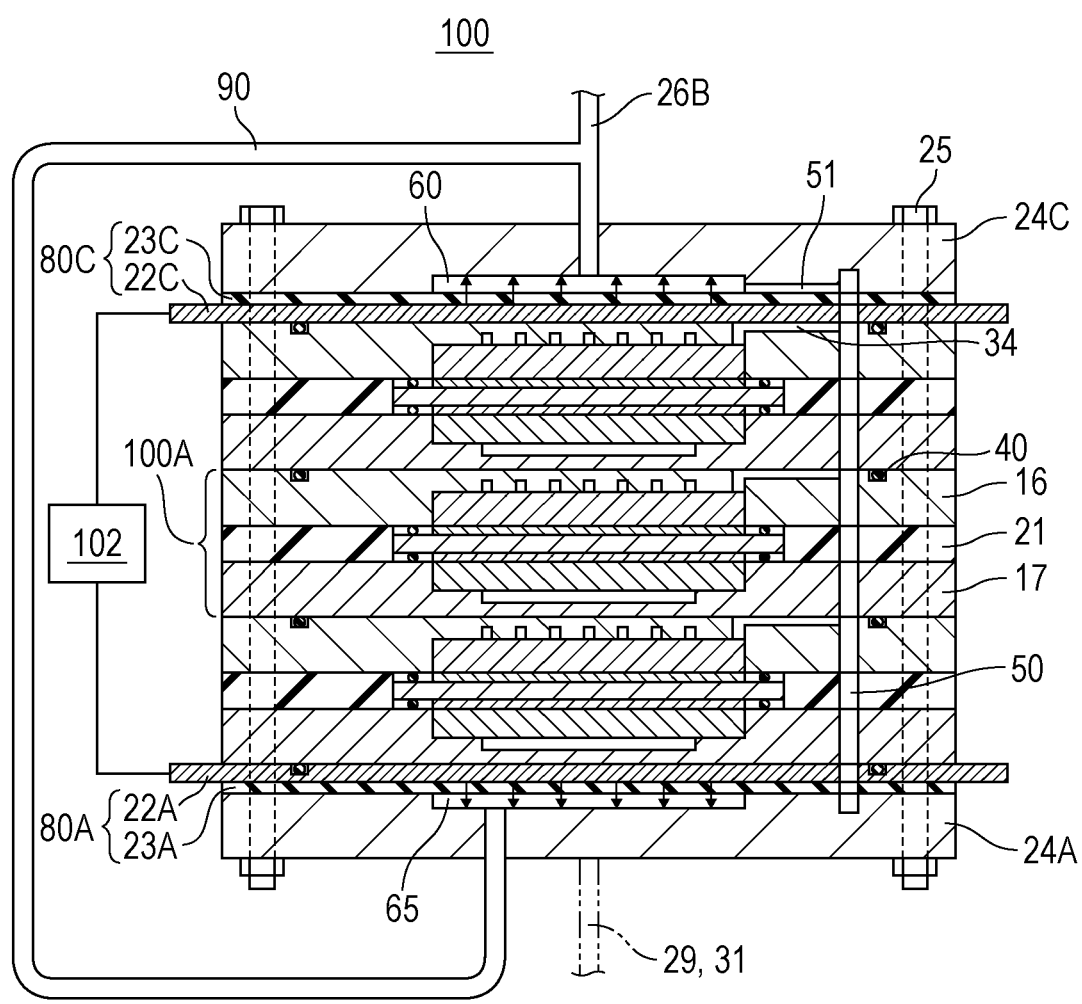
FIG. 10 is a view illustrating an example electrochemical hydrogen pump according to a fourth embodiment.

FIG. 10 is a view illustrating an example electrochemical hydrogen pump according to a fourth embodiment.

FIG. 10 illustrates the vertical cross-section of an electrochemical hydrogen pump 100 including a straight line that passes through the center of the electrochemical hydrogen pump 100 and the center of a cathode gas outlet manifold 50 in plan view.

The electrochemical hydrogen pump 100 according to this embodiment is the same as the electrochemical hydrogen pump 100 according to the third embodiment except for the structure of the second gas flow channel described below.

In the electrochemical hydrogen pump 100 according to this embodiment, the second gas flow channel includes a communication flow channel through which a first space 60 is in communication with a second space 65. In this case, it is not necessary to provide the cathode gas supply channel 52 (see FIG. 7) through which the cathode gas outlet manifold 50 is in communication with the second space 65.

Specifically, for example, as illustrated in FIG. 10, a communication flow channel member 90 passes through the anode end plate 24A and extends so as to reach the second space 65. The communication flow channel member 90 diverges from a cathode gas outlet pipe 26B constituting a cathode gas outlet channel 26. In other words, in the example illustrated in FIG. 10, the communication flow channel member 90 is a member through which the first space 60 is in communication with the second space 65. The structure of the communication flow channel member is not limited to this. For example, the communication flow channel member may pass through the cathode end plate 24C and the anode end plate 24A instead of diverging from the cathode gas outlet pipe 26B.

Accordingly, in the electrochemical hydrogen pump 100 according to this embodiment, high-pressure hydrogen generated in the cathode CA of the hydrogen pump unit 100A can be supplied to the second space 65 disposed between the anode end plate 24A and the anode separator 17 through the communication flow channel member 90.

The operation and effect of the electrochemical hydrogen pump 100 according to this embodiment are the same as the operation and effect of the electrochemical hydrogen pump 100 according to the third embodiment, and detailed description of the operation and effect is thus omitted.

The electrochemical hydrogen pump 100 according to this embodiment may be the same as the electrochemical hydrogen pump 100 according to any one of the first embodiment, Example 1 to Example 5 according to the first embodiment, Modification 1 to Modification 3 according to the first embodiment, the second embodiment, the third embodiment, Example 1 to Example 5 according to the third embodiment, and Modification 1 to Modification 3 according to the third embodiment, except for the foregoing features.

The first embodiment, Example 1 to Example 5 according to the first embodiment, Modification 1 to Modification 3 according to the first embodiment, the second embodiment, the third embodiment, Example 1 to Example 5 according to the third embodiment, Modification 1 to Modification 3 according to the third embodiment, and the fourth embodiment may be combined with each other unless they exclude each other.

From the above description, many improvements and other embodiments of the present disclosure are apparent to those skilled in the art. Therefore, the above description should be construed as illustrative only and is provided for the purpose of teaching those skilled in the art the best modes for carrying out the present disclosure. The details of the structure and/or function of the present disclosure can be substantially modified without departing from the spirit of the present disclosure.

One aspect of the present disclosure can be used for an electrochemical hydrogen pump in which an increase in contact resistance between a cathode separator and a cathode in a hydrogen pump unit can be appropriately suppressed, compared with the related art.

What is claimed is:

1. An electrochemical hydrogen pump comprising:
   at least one hydrogen pump unit that includes an electrolyte membrane, an anode disposed on a first main surface of the electrolyte membrane, a cathode disposed on a second main surface of the electrolyte membrane, an anode separator stacked on the anode, and a cathode separator stacked on the cathode;
   an anode end plate that is disposed on the anode separator positioned in a first end in a stacking direction;
   a cathode end plate that is disposed on the cathode separator positioned in a second end in the stacking direction, the first end being one end in the stacking direction, the second end being another end in the stacking direction;
   a fixing member that prevents at least members from the cathode end plate to the cathode separator positioned in the second end from moving in the stacking direction;
   a first space disposed between the cathode end plate and the cathode separator positioned in the second end;
   a first gas flow channel through which hydrogen generated in the cathode is supplied to the first space;
   a first cathode gas outlet channel in communication with the first space, and
   a first pressure transmitting member that is disposed in the first space and transmits a pressure from the cathode separator positioned in the second end to the cathode end plate,
   wherein an entirety of an opening of the first cathode gas outlet channel at a first space side faces a surface of the first pressure transmitting member, and
   the first pressure transmitting member is made of a gas diffusible material.

2. The electrochemical hydrogen pump according to claim 1, further comprising:
   a cathode plate member disposed between the cathode end plate and the cathode separator positioned in the second end such that the first space is disposed between the cathode plate member and the cathode end plate,
   wherein the first pressure transmitting member is disposed between the cathode end plate and the cathode plate member.

3. The electrochemical hydrogen pump according to claim 2, wherein the fixing member includes a bolt, and the bolt passes through the cathode plate member and the cathode separator positioned in the second end.

4. The electrochemical hydrogen pump according to claim 2, wherein the cathode plate member includes a cathode insulating plate, and the first pressure transmitting member is disposed between the cathode end plate and the cathode insulating plate.

5. The electrochemical hydrogen pump according to claim 2, wherein
   the cathode plate member includes a cathode power supply plate, and
   the first pressure transmitting member is disposed between the cathode end plate and the cathode power supply plate.

6. The electrochemical hydrogen pump according to claim 1, wherein the first pressure transmitting member includes an elastic member.

7. The electrochemical hydrogen pump according to claim 1, wherein
   the fixing member further prevents members from the anode end plate to the anode separator positioned in the first end from moving in the stacking direction; and
   the electrochemical hydrogen pump further comprises:
   a second gas flow channel through which hydrogen generated in the cathode is supplied to a second space disposed between the anode end plate and the anode separator positioned in the first end; and
   a second pressure transmitting member that is disposed in the second space and transmits a pressure from the anode separator positioned in the first end to the anode end plate.

8. The electrochemical hydrogen pump according to claim 7, further comprising:
   an anode plate member disposed between the anode end plate and the anode separator positioned in the first end, wherein the second pressure transmitting member is disposed between the anode end plate and the anode plate member and includes a columnar member separated from or integrated with the anode end plate.

9. The electrochemical hydrogen pump according to claim 8, wherein a bolt included in the fixing member passes through the anode plate member and the anode separator positioned in the first end.

10. The electrochemical hydrogen pump according to claim 8, wherein
the anode plate member includes an anode insulating plate, and
the columnar member is disposed between the anode end plate and the anode insulating plate.

11. The electrochemical hydrogen pump according to claim 8, wherein
the anode plate member includes an anode power supply plate, and
the columnar member is disposed between the anode end plate and the anode power supply plate.

12. The electrochemical hydrogen pump according to claim 11, wherein the columnar member is an insulating member.

13. The electrochemical hydrogen pump according to claim 7, wherein the second pressure transmitting member is a porous member.

14. The electrochemical hydrogen pump according to claim 7, wherein the second pressure transmitting member is an elastic member.

15. The electrochemical hydrogen pump according to claim 1, wherein
the anode includes an anode gas diffusion layer,
the cathode includes a cathode gas diffusion layer, and
the anode gas diffusion layer has a higher elastic modulus than the cathode gas diffusion layer.

16. An electrochemical hydrogen pump comprising:
at least one hydrogen pump unit that includes an electrolyte membrane, an anode disposed on a first main surface of the electrolyte membrane, a cathode disposed on a second main surface of the electrolyte membrane, an anode separator stacked on the anode, and a cathode separator stacked on the cathode;
an anode end plate that is disposed on the anode separator positioned in a first end in a stacking direction;
a cathode end plate that is disposed on the cathode separator positioned in a second end in the stacking direction, the first end being one end in the stacking direction, the second end being another end in the stacking direction;
a fixing member that prevents at least members from the cathode end plate to the cathode separator positioned in the second end from moving in the stacking direction;
a first space disposed between the cathode end plate and the cathode separator positioned in the second end;
a first gas flow channel through which hydrogen generated in the cathode is supplied to the first space; and
a first pressure transmitting member that is disposed in the first space and transmits a pressure from the cathode separator positioned in the second end to the cathode end plate, wherein:
the cathode includes a cathode gas diffusion layer, and
the first pressure transmitting member has the same elastic modulus as the cathode gas diffusion layer included in the cathode.

17. The electrochemical hydrogen pump according to claim 7, wherein the second pressure transmitting member has the same elastic modulus as the cathode gas diffusion layer included in the cathode.

18. The electrochemical hydrogen pump according to claim 1, wherein:
the at least one hydrogen pump unit is sandwiched between the anode end plate and the cathode end plat, and
the fixing member is a fastener that fastens at least the anode end plate and the cathode end plate together with the at least one hydrogen pump unit.

19. The electrochemical hydrogen pump according to claim 1, wherein:
the first gas flow channel includes a cathode gas outlet manifold and a communication path connecting the first space and the cathode gas outlet manifold, and
a cathode gas supplied from a cathode gas channel, which is disposed in the cathode separator, flows into the cathode gas outlet manifold.

* * * * *